(12) United States Patent
Shi et al.

(10) Patent No.: US 12,474,863 B2
(45) Date of Patent: Nov. 18, 2025

(54) CHIP, METHOD FOR FLEXIBLY ACCESSING DATA, DEVICE, AND MEDIUM

(71) Applicant: Beijing Youzhuju Network Technology Co., Ltd., Beijing (CN)

(72) Inventors: Yunfeng Shi, Beijing (CN); Jun Zhou, Beijing (CN); Jian Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/021,790

(22) Filed: Jan. 15, 2025

(65) Prior Publication Data
US 2025/0156109 A1 May 15, 2025

Related U.S. Application Data

(63) Continuation of application No. PCT/CN2023/107010, filed on Jul. 12, 2023.

(30) Foreign Application Priority Data

Jul. 15, 2022 (CN) .......................... 202210836577.0

(51) Int. Cl.
G06F 3/06 (2006.01)

(52) U.S. Cl.
CPC .......... G06F 3/0655 (2013.01); G06F 3/0604 (2013.01); G06F 3/0679 (2013.01)

(58) Field of Classification Search
CPC .................................. G06T 1/20; G06T 1/60
See application file for complete search history.

(56) References Cited

U.S. PATENT DOCUMENTS 11,797,876 B1 * 10/2023 Wang ................... G06N 3/0464
2018/0197068 A1 7/2018 Narayanaswami et al.
(Continued)

FOREIGN PATENT DOCUMENTS

| CN | 110462586 A | 11/2019 |
|---|---|---|
| CN | 111160545 A | 5/2020 |

(Continued)

OTHER PUBLICATIONS

Ditzel at el., Accelerating ML Recommendation With Over 1,000 RISC-V/Tensor Processors on Esperanto's ET-SoC-1 Chip, IEEE Micro, Hot chips 33, May 2022, pp. 31-38 (Year: 2022).*

(Continued)

*Primary Examiner* — Charles Tseng
(74) *Attorney, Agent, or Firm* — BakerHostetler

(57) ABSTRACT

A processor chip, a method for flexibly accessing data in the processor chip, an electronic device, and a non-transitory storage medium are provided. The chip includes: a memory, configured to store read-in tensor data from outside the processor chip; a storage control unit, configured to control reading elements from the memory according to the tensor operation of the operator to send the elements to a computing unit, where the storage control unit includes an address computing module, and the address computing module computes addresses in the memory in one-layer read loop or multi-layer read loop nest according to the parameter configured that is received by the interface, so as to read the elements from computed addresses and send the elements to the computing unit; and the computing unit, configured to perform the tensor operation of the operator by using the elements received.

18 Claims, 6 Drawing Sheets

(56) References Cited

U.S. PATENT DOCUMENTS

| | | | |
|---|---|---|---|
| 2018/0341479 A1* | 11/2018 | Temam | G06F 9/34 |
| 2021/0097432 A1* | 4/2021 | Olgiati | G06F 17/18 |
| 2021/0255976 A1* | 8/2021 | Gottscho | G06F 13/28 |
| 2022/0058476 A1* | 2/2022 | Calidas | G06N 3/08 |
| 2022/0113968 A1 | 4/2022 | Harthcock | |
| 2022/0164192 A1 | 5/2022 | Lyuh et al. | |

FOREIGN PATENT DOCUMENTS

| | | |
|---|---|---|
| CN | 111767508 A | 10/2020 |
| CN | 113722269 A | 11/2021 |

OTHER PUBLICATIONS

Gianoglio et al., Efficient Digital Implementation of n-mode Tensor-Matrix Multiplication, 2021 IEEE 3rd International Conference on Artificial Intelligence Circuits and Systems, Jun. 2021 (Year: 2021).*
International Search Report and Written Opinion from PCT/CN2023/107010, dated Oct. 18, 2023, 13 pages with English translation.
European Patent Application No. 23838982.9; Extended Search Report; dated Aug. 22, 2025; 7 pages.

* cited by examiner

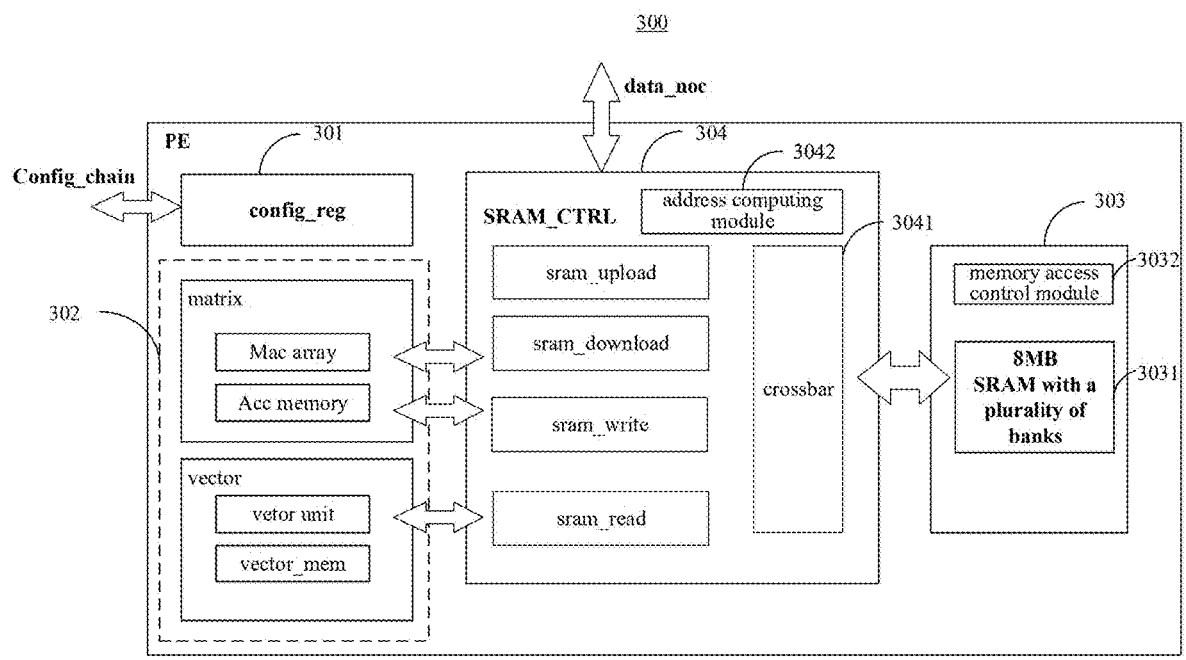
Fig. 3
| 0 | 1 | 2 | 3 | 4 | 5 | 6 | 7 | 8 |
|---|---|---|---|---|---|---|---|---|
| 9 | 10 | 11 | 12 | 13 | 14 | 15 | 16 | 17 |
Fig. 4
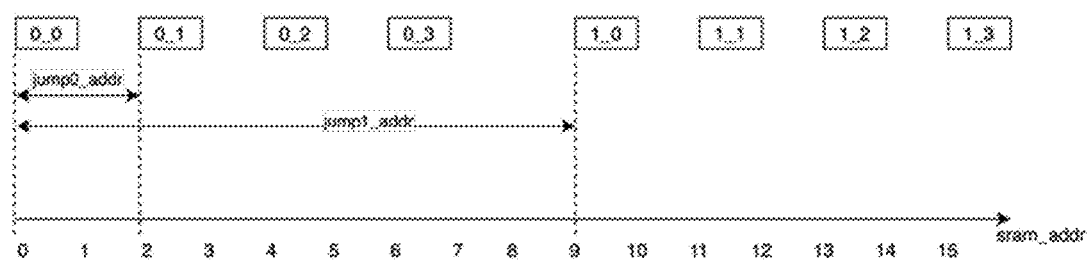
Fig. 5

| 0 | 1 | 2 | 3 | 4 | 5 | 6 | 7 |
| --- | --- | --- | --- | --- | --- | --- | --- |
| 8 | 9 | 10 | 11 | 12 | 13 | 14 | 15 |
| 16 | 17 | 18 | 19 | 20 | 21 | 22 | 23 |

800

---

801 storing, by a memory in the processor chip, read-in tensor data from outside the processor chip, the read-in tensor data comprising a plurality of elements for performing a tensor operation of an operator comprised in computation

---

802 controlling reading elements from the memory according to the tensor operation of the operator to send the elements to a computing unit, comprising: computing addresses in the memory in one-layer read loop or multi-layer read loop nest according to a parameter that is configured by software and is received, so as to read the elements from computed addresses and send the elements to the computing unit in the processor chip

---

803 performing, by the computing unit, the tensor operation of the operator by using the elements received

Fig. 8

CHIP, METHOD FOR FLEXIBLY ACCESSING DATA, DEVICE, AND MEDIUM

CROSS-REFERENCE TO RELATED APPLICATION

This application is a continuation of International Patent Application No. PCT/CN2023/107010, filed on Jul. 12, 2023, which claims the priority to and benefits of Chinese patent application No. 202210836577.0, filed on Jul. 15, 2022. All the aforementioned patent applications are hereby incorporated by reference in their entireties.

TECHNICAL FIELD

The present disclosure relates to a processor chip for flexibly accessing data, a method for flexibly accessing data in the processor chip, an electronic device, and a non-transitory storage medium.

BACKGROUND

In order that the chip has better performance, fully utilizes computing power, and improves media access control (MAC) address utilization rate, the design of data pipeline is very crucial. In the neural network computation process, there are various supply modes and storage modes for the input data and output data of the computing unit, which also determines different chip storage computing architectures. For example, the graphic processing unit (GPU) is a parallel computing processor that adopts a multi-level cache system, with storage levels consisting of an L1 cache, a shared memory, a register group, an L2 cache, and an external storage DRAM, etc. A main purpose of dividing these storage levels is to reduce data move latency and improve bandwidth. The L1 cache is usually divided into an LID cache and an LII cache, which are respectively used for storing data and instructions. Usually, corresponding L1 caches are respectively set for respective processor cores, with sizes respectively ranging from 16k to 64k. The L2 cache usually serves as a private cache, without distinguishing between instructions and data. Usually, corresponding L2 caches are respectively set for respective processor cores, with sizes respectively ranging from 256k to 1M. For example, the L1 cache has a fastest cache speed but smaller space; the L2 cache has a slower speed and larger space; and the external DRAM has the largest space but the slowest speed, and so on. Therefore, by storing the frequently accessed data from the DRAM into the L1 cache, latency in moving data from the external DRAM to the memory during each access can be reduced, which improves efficiency of data processing. However, in order that the processor structure ensures universality and flexibility, the data pipeline has a certain degree of redundancy. For example, each computation process has to start from fetching data from a register and end up storing the data into the register, resulting in high power consumption.

Some chips may achieve high efficiency through a customized pipeline, but with the cost of sacrificing flexibility, and once modified, the network structure may be unavailable. In addition, there are also chips that solve bandwidth and latency problems by adding a large on-chip buffer, but the access mode for the static random access memory (SRAM) is initiated by hardware, that is to say, computation and storage are hardware-coupled. This will lead to the problem of inflexible strategies, resulting in lowered efficiency in certain scenarios where the software cannot get involved.

SUMMARY

According to an aspect of the present disclosure, a processor chip for flexibly accessing data is provided. The processor chip comprises: a memory, configured to store read-in tensor data from outside the processor chip, the read-in tensor data comprising a plurality of elements for performing a tensor operation of an operator comprised in computation; a storage control unit, configured to control reading elements from the memory according to the tensor operation of the operator to send the elements to a computing unit, wherein the storage control unit comprises an address computing module, the address computing module has an interface for receiving a parameter that is configured by software, and the address computing module computes addresses in the memory in one-layer read loop or multi-layer read loop nest according to the parameter configured that is received by the interface, so as to read the elements from computed addresses and send the elements to the computing unit; and the computing unit, configured to perform the tensor operation of the operator by using the elements received.

In another aspect, a method for flexibly accessing data in a processor chip is provided. The method comprises: storing, by a memory in the processor chip, read-in tensor data from outside the processor chip, the read-in tensor data comprising a plurality of elements for performing a tensor operation of an operator comprised in computation; controlling reading elements from the memory according to the tensor operation of the operator to send the elements to a computing unit, comprising: computing addresses in the memory in one-layer read loop or multi-layer read loop nest according to a parameter that is configured by software and is received, so as to read the elements from computed addresses and send the elements to the computing unit in the processor chip; and performing, by the computing unit, the tensor operation of the operator by using the elements received.

In another aspect, an electronic device is provided. The electronic device comprises: a memory, configured to store instructions; and a processor, configured to read the instructions from the memory and execute the method of respective embodiments of the present disclosure.

In another aspect, a non-transitory storage medium is provided, and instructions are stored on the non-transitory storage medium.

The instructions, when read by a processor, cause the processor to execute the method of respective embodiments of the present disclosure.

In this way, addresses in the memory can be flexibly computed through the software configured parameter to flexibly read elements in the memory, without being limited to an order of storing these elements or address sorting in the memory.

BRIEF DESCRIPTION OF DRAWINGS

In order to clearly illustrate the technical solutions of the embodiments of the disclosure or the existing technology, the drawings needed to describe the embodiments or the existing technology are briefly described in the following. Apparently, the described drawings are only drawings of part of the embodiments of the disclosure. For those skilled in the art, other accompany drawings can be obtained based on these drawings without creative labor.

FIG. 3 shows a decomposition schematic diagram of the processor chip for flexibly accessing data according to an embodiment of the present disclosure.

FIG. 4 shows an example of performing 2-layer loop nest read on an input tensor according to an embodiment of the present disclosure.

FIG. 5 shows a schematic diagram of computing an address according to a parameter that is configured by software according to an embodiment of the present disclosure.

FIG. 8 shows a flow chart of a method for flexibly accessing data in a processor chip according to an embodiment of the present disclosure.

DETAILED DESCRIPTION

Figure 1:
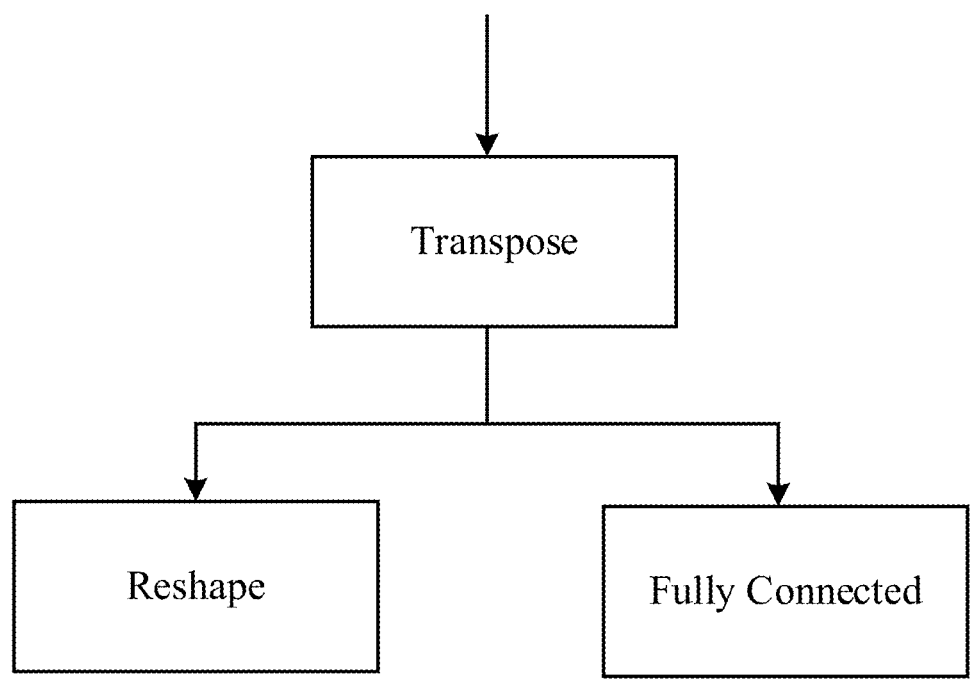
FIG. 1 shows an exemplary diagram of one computational graph in a neural network applied to image data processing and recognition.

Examples of this disclosure are illustrated in the accompanying drawings with reference to the specific embodiments of the disclosure in detail. Although the present disclosure will be described in conjunction with specific embodiments, it will be understood that it is not intended to limit the present disclosure to the described embodiments. On the contrary, it is intended to cover the changes, modifications, and equivalents included within the spirit and scope of the disclosure as defined by the attached claims. It should be noted that the method steps described here can be implemented by any functional block or arrangement, and any functional block or arrangement can be implemented as a physical entity or a logical entity, or a combination thereof.

It should be understood that before using the technical solutions disclosed in the embodiments of the disclosure, users should be informed and authorized in an appropriate manner according to relevant laws and regulations regarding the type, scope of use, and usage scenarios of personal information involved in this disclosure.

For example, in response to receiving an active request of a user, a prompt message is sent to the user to clearly remind the user that the operation to be executed as requested by the user will require and use personal information of the user. Thus, according to the prompt information, the user may autonomously choose whether to provide personal information to software or hardware such as an electronic device, an application, a server, or a storage medium that executes the operation of the technical solution of the present disclosure.

As an optional but non-restrictive implementation, in response to receiving an active request of a user, a prompt message may be sent to the user through a pop-up window, where a prompt message may be presented in text. In addition, the pop-up window may also carry a selection control for the user to choose whether to "agree" or "disagree" to provide personal information to the electronic device.

It can be understood that the above notification and user authorization process are only illustrative and do not limit the implementation modes of this disclosure. Other modes that comply with relevant laws and regulations can also be applied to the implementation modes of this disclosure.

It can be understood that the data involved in the technical solutions (including but not limited to the data itself, data acquisition or use) should comply with the requirements of corresponding laws, regulations and relevant provisions.

A recognition process for the above-described application scenario may be implemented by a neural network receiving various input application data as tensor and computing the same through the neural network. Currently, the neural network or the machine learning system uses a tensor as a basic data structure. The core of the concept of tensor rests in that the tensor is a data container, and the data contained thereby is almost always numerical data, making the tensor a container of numbers. The specific numerical value in the tensor may be application data, for example, including image data, natural language data, and so on.

For example, a scalar is a zero-dimensional tensor, for example, 2,3,5. In a specific application scenario, for example, for image data, 2 represents the grayscale value of one pixel in the image data, 3 represents the grayscale value of one pixel in the image data, and 5 represents the grayscale value of one pixel in the image data, etc. For example, a vector is a one-dimensional tensor, for example, [0,3,20], and a matrix is a two-dimensional tensor, for example, $$\begin{bmatrix} 2 & 3 \\ 1 & 5 \end{bmatrix}$$

or [[2,3], [1,5]]. For example, there may also be three-dimensional tensors (e.g., a: (shape: (3,2,1)), [[[1], [2]], [[3], [4]], [[5], [6]]]), four-dimensional tensors, and so on. These tensors may all be used to represent data in specific application scenarios, for example, image data, natural language data, and so on. Neural network functions for these application data may include image recognition (e.g., inputting image data to recognizing what the animal contained in the image is), natural language recognition (e.g., inputting language of a user to recognize the user's intention to speak, for example, whether the user is speaking to open a music player), and so on.

The recognition process for the above-described application scenarios may be implemented by the neural network receiving various input application data as tensors and computing the same through the neural network. As illustrated above, computation of the neural network may be composed of a series of tensor operations, and these tensor operations may be complex geometric transformations of input data for several dimensions of tensors. These tensor operations may be referred to as operators. The neural network computation may be transformed into a computational graph, the computational graph has a plurality of operators, and the plurality of operators may be connected by lines, representing dependency relationships between computations of respective operators.

A chip is dedicated to neural network operations, which is a specially designed chip mainly for accelerate neural network execution. The neural network may be expressed by using pure mathematical formulas. According to these mathematical formulas, the neural network may be represented by using a computational graph model. The computational graph is a visual representation of these mathematical formulas. The computational graph model may split a composite operation into a plurality of sub-operations, and each sub-operation is referred to as an operator (Op).

Computation of the neural network will generate a large amount of intermediate data. If all the intermediate data are stored in a dynamic random access memory (DRAM), overall performance may be low due to excessive latency and insufficient bandwidth. This problem may be alleviated by providing the L2 cache, which has an advantage of invisibility to programming, so programming will not be affected and latency may be reduced. However, problems in addresses and timing to access the L2 cache may result in a higher rate of cache miss. In addition, time for accessing data is also hard to hide when locality is poor.

Data required and generated during neural network computation is stored by using on-chip SRAM of the chip, which may actively control flow of data through software, and may hide time for moving data between SRAM and DRAM through pre-configuration. Because the data access mode of neural network computation is flexible, some operators will have to be completed by using multiple computation processes if access flexibility of SRAM is not sufficient.

However, if data computation and data move are completely coupled and initiated through hardware, then the computation mode of the operators will be fixed, without space for software adjustment.

Therefore, a mode of more flexibly accessing the on-chip SRAM of the chip is still needed.

FIG. 1 shows an exemplary diagram of a computational graph in a neural network applied to image data processing and recognition.

For example, a tensor carrying image data (e.g., chromaticity values of pixels) is input into the exemplary computational graph shown in FIG. 1. The computational graph only shows some operators for convenience of browsing by a reader. The operation process of the computational graph is: firstly, the tensor undergoes Transpose operator computation, then one branch undergoes Reshape operator computation, and the other branch undergoes Fully connected operator computation.

It is assumed that the tensor is firstly input into the Transpose operator, where the Transpose operator is a tensor operation without changing the numerical value in the input tensor. The Transpose operator plays a role in changing a dimension (an axis) arrangement order of an array. For example, with respect to a two-dimensional array, counterchange of orders of the two dimension is matrix transpose. The Transpose operator may be applied to cases of more dimensions (axes). An input parameter of the Transpose operator is a dimension arrangement order of an output array, counting from an order number 0. It is assumed that the input tensor of the Transpose operator is, for example, a two-dimensional matrix [[1, 2, 3], [4, 5, 6], [7, 8, 9], [10, 11, 12]] or represented as $$\begin{bmatrix} 1 & 2 & 3 \\ 4 & 5 & 6 \\ 7 & 8 & 9 \\ 10 & 11 & 12 \end{bmatrix},$$

for example, representing that the image data is a two-dimensional matrix of 4*3. Transpose ([[1, 2, 3], [4, 5, 6], [7, 8, 9], [10, 11, 12]]) represents transposing, that is, changing the two-dimensional matrix into [[1, 4, 7, 10], [2, 5, 8, 11], [3, 6, 9, 12]], or a matrix of 3*4 represented as $$\begin{bmatrix} 1 & 4 & 7 & 10 \\ 2 & 5 & 8 & 11 \\ 3 & 6 & 9 & 12 \end{bmatrix}.$$

As may be seen, although the Transpose operator changes the dimension arrangement order, that is, changes the shape of the tensor, it does not change the numerical values in the tensor, for example, the numerical values are still 1, 2, 3, 4, 5, 6, 7, 8, 9, 10, 11, 12. Of course, the Transpose operator may also change an arrangement order of the numerical values, without changing the shape of the tensor (e.g., a 3*3 matrix is still a 3*3 matrix after transpose) and the numerical values in the tensor.

Then, the above-described tensor $$\begin{bmatrix} 1 & 4 & 7 & 10 \\ 2 & 5 & 8 & 11 \\ 3 & 6 & 9 & 12 \end{bmatrix}$$

having undergone the Transpose operator operation is divided into two branches. One branch is to undergo Reshape operator computation, while the other branch is to undergo Fully connected operator computation.

Specific operation of the Reshape operator is changing a shape property of the tensor, which may arrange a matrix a of m*n into a matrix b with a size of i*j. For example, the Reshape operator (Reshape (A, 2, 6), where, A is the input tensor) changes the shape of the above-described tensor $$\begin{bmatrix} 1 & 4 & 7 & 10 \\ 2 & 5 & 8 & 11 \\ 3 & 6 & 9 & 12 \end{bmatrix}$$

from 3*4 into 2*6. Therefore, the output tensor obtained through the Reshape operator is, for example, $$\begin{bmatrix} 1 & 3 & 5 & 7 & 9 & 11 \\ 2 & 4 & 6 & 8 & 10 & 12 \end{bmatrix}.$$

It may be seen that the Reshape operator also changes the shape of the tensor without changing the numerical values in the tensor, for example, the numerical values are still 1, 2, 3, 4, 5, 6, 7, 8, 9, 10, 11, 12.

The Fully connected operator (also referred to as a Full Connection operator) may be regarded as a special convolutional layer or as a product of tensors, which takes the entire tensor input as a feature map and performs feature extraction operation. That is, one feature space is linearly transformed to another feature space, and the output tensor is a weighted sum of the input tensor. For example, the Fully connected operator has an input tensor (the output tensor of the Transpose operator)

$$\begin{bmatrix} 1 & 4 & 7 & 10 \\ 2 & 5 & 8 & 11 \\ 3 & 6 & 9 & 12 \end{bmatrix}$$

matrix multiplied by a weight matrix x with a size of 4*1, for example, $$\begin{matrix} 40 \\ 50 \\ 60 \\ 70 \end{matrix},$$

that is, respectively reads rows of the transposed matrix, with a first row multiplied by the weight matrix x, then a second row multiplied by the weight matrix x, and finally a third row multiplied by the weight matrix x. Specifically, 1 multiplied by 40 plus 4 multiplied by 50 plus 7 multiplied by 60 plus 10 multiplied by 70 serves as a first value of a result tensor of the Fully connected operator; 2 multiplied by 40 plus 5 multiplied by 50 plus 8 multiplied by 60 plus 11 multiplied by 70 serves as a second value of the result tensor of the Fully connected operator; and 3 multiplied by 40 plus 6 multiplied by 50 plus 9 multiplied by 60 plus 12 multiplied by 70 serves as a third value of the result tensor of the Fully connected operator.

In the existing technology, when performing the computation process from the Transpose operator to the Fully connected operator in the computational graph shown in FIG. 1 through a chip, the chip firstly reads the input tensor of the Transpose operator into a memory of a storage unit inside the chip. The input tensor is assumed to be $$\begin{bmatrix} 1 & 2 & 3 \\ 4 & 5 & 6 \\ 7 & 8 & 9 \\ 10 & 11 & 12 \end{bmatrix},$$

which is usually continuously stored in the memory of the storage unit inside the chip, that is, stored as 1, 2, 3, 4, 5, 6, 7, 8, 9, 10, 11, 12. Then, a computing unit in the chip runs the operation of the Transpose operator (e.g., transforming 4*3 to 3*4), to transform the input tensor into $$\begin{bmatrix} 1 & 4 & 7 & 10 \\ 2 & 5 & 8 & 11 \\ 3 & 6 & 9 & 12 \end{bmatrix}.$$

Next, the chip stores the transformed result tensor $$\begin{bmatrix} 1 & 4 & 7 & 10 \\ 2 & 5 & 8 & 11 \\ 3 & 6 & 9 & 12 \end{bmatrix}$$

in the memory of the storage unit inside the chip as intermediate data. In this case, the result tensor is usually continuously stored in the memory of the storage unit inside the chip, that is, stored as 1, 4, 7, 10, 2, 5, 8, 11, 3, 6, 9, 12. So far, the operation of the Transpose operator is completed.

Then the operation of the Fully connected operator is executed. The input tensor (the output tensor of the Transpose operator)

$$\begin{bmatrix} 1 & 4 & 7 & 10 \\ 2 & 5 & 8 & 11 \\ 3 & 6 & 9 & 12 \end{bmatrix}$$

matrix is multiplied by the weight matrix x with a size of 4*1, for example, $$\begin{matrix} 40 \\ 50 \\ 60 \\ 70 \end{matrix},$$

Firstly, the chip reads in the weight matrix x, for example, $$\begin{matrix} 40 \\ 50 \\ 60 \\ 70 \end{matrix},$$

The weight matrix x is usually continuously stored in the memory of the storage unit inside the chip, that is, stored as 40, 50, 60, 70. Then, the computing unit respectively reads one numerical value from the output tensor of the Transpose operator from the memory of the storage unit in the storage order, respectively reads the corresponding numerical value from the weight matrix x in the storage order, and performs multiplication and addition. Specifically, 1 multiplied by 40 plus 4 multiplied by 50 plus 7 multiplied by 60 plus 10 multiplied by 70 serves as a first value of a result tensor of the Fully connected operator; 2 multiplied by 40 plus 5 multiplied by 50 plus 8 multiplied by 60 plus 11 multiplied by 70 serves as a second value of the result tensor of the Fully connected operator; and 3 multiplied by 40 plus 6 multiplied by 50 plus 9 multiplied by 60 plus 12 multiplied by 70 serves as a third value of the result tensor of the Fully connected operator. Then, the computing unit of the chip stores the computation results in the memory of the storage unit inside the chip.

That is to say, for the computation of the Transpose operator and subsequent computation of the Fully connected operator, respective hardware units of the chip need to cooperate in the process of reading, computing, storing, re-reading, re-computing, and re-storing, but computational efficiency and flexibility of the entire process are very low.

The present disclosure proposes a mode used in a processor chip for flexibly accessing data, which may utilize software configuration and related parameters of the processor chip to replace operations of some operators with a read operation of the chip for flexibly accessing data, so as to improve computational efficiency.

Figure 2:
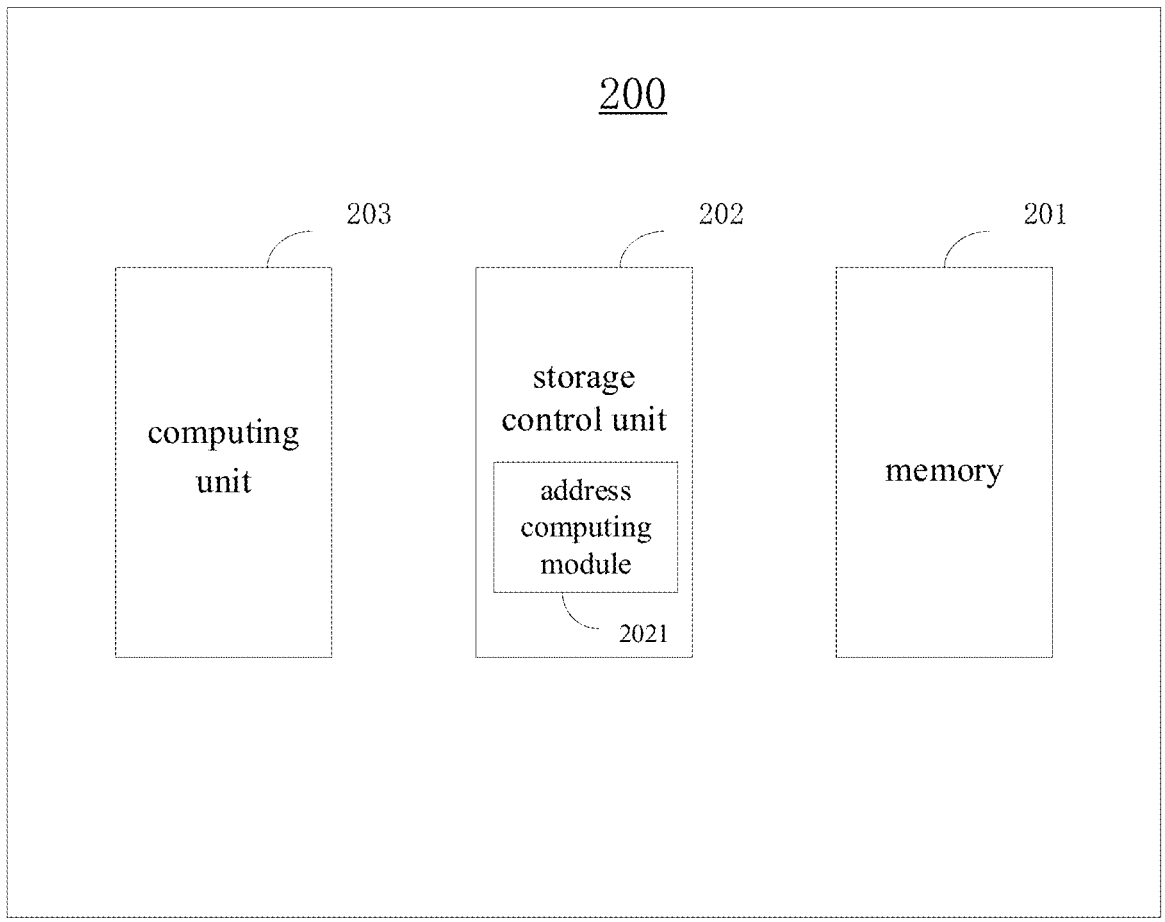
FIG. 2 shows a schematic diagram of a processor chip for flexibly accessing data according to an embodiment of the present disclosure.

FIG. 2 shows a schematic diagram of a processor chip for flexibly accessing data according to an embodiment of the present disclosure.

As shown in FIG. 2, a processor chip 200 for flexibly accessing data includes: a memory 201, configured to store read-in tensor data from outside the processor chip 200, the read-in tensor data including a plurality of elements for performing a tensor operation of an operator included in computation; a storage control unit 202, configured to control reading elements from the memory according to the tensor operation of the operator to send the elements to the computing unit 203, wherein the storage control unit 202 includes an address computing module 2021, the address computing module 2021 has an interface for receiving a parameter that is configured by software, and the address computing module 2021 computes addresses in the memory in one-layer read loop or multi-layer read loop nest according to the configured parameter, so as to read the elements from the computed addresses and send the elements to the computing unit 203; and the computing unit 203, configured to perform the tensor operation of the operator by using the elements received.

According to this embodiment, the address computing module 2021 is provided in the storage control unit 202. The address computing module 2021 has an interface for receiving the software configured parameter. The address computing module 2021 can compute the address in the memory in one-layer read loop or multi-layer read loop nest according to the configured parameter, to read elements from the computed addresses and send the same to the computing unit 203. In this way, the software configured parameter can be used to flexibly compute the addresses in the memory for reading, that is to say, such flexibly computed addresses may have an order different from the storage order, and elements can be read in a new read order configured by a user through software according to the parameter, instead of having to be read in the storage order as in the existing technology.

Thus, the software configured parameter can be used to flexibly compute the addresses in the memory to flexibly read elements in the memory, without being limited to an order of storing these elements or address sorting in the memory.

Combining the example in FIG. 1, the Transpose operator changes the dimension arrangement order without changing the elements in the tensor, which are still 1, 2, 3, 4, 5, 6, 7, 8, 9, 10, 11, 12. That is to say, if the addresses in the memory can be computed in one-layer read loop or multi-layer read loop nest according to the configured parameter so as to read elements from the computed addresses and send the same to the computing unit 203, then the user may use the parameter to configure a new read order by software, so that these stored elements 1, 2, 3, 4, 5, 6, 7, 8, 9, 10, 11, 12 may be read by means of the tensor transposed by the Transpose operator.

Specifically, the input tensor is assumed to be $$\begin{bmatrix} 1 & 2 & 3 \\ 4 & 5 & 6 \\ 7 & 8 & 9 \\ 10 & 11 & 12 \end{bmatrix},$$

which is usually continuously stored in the memory of the storage unit inside the chip, that is, stored as 1, 2, 3, 4, 5, 6, 7, 8, 9, 10, 11, 12 (e.g., whose memory addresses (hexadecimal) are, for example, 00000001, 00000002, 00000003, 00000004, 00000005, 00000006, 00000007, 00000008, 00000009, 00000010, 00000011, 00000012). Then the user may use the parameter to configure a new read order by software, so that the address computing module 2021 can compute the addresses in the memory according to the configured parameter, for example, an order of the addresses in the memory computed according to the configured parameter is: 00000001, 00000004, 00000007, 00000010, 00000002, 00000005, 00000008, 00000011, 00000003, 00000006, 00000009, 00000012, that is, the address read order may be directly used to replace the transpose operation of the Transpose operator.

In this way, the software configured parameter can be used to flexibly compute the addresses in the memory for reading, that is to say, such flexibly computed addresses may have an order different from the storage order, and elements can be read in a new read order configured by a user through software according to the parameter, instead of having to be read in the storage order as in the existing technology.

In an embodiment, the parameter that is configured by software indicates that the tensor operation of the operator is replaced by a mode of reading elements from the addresses in the memory according to the tensor operation of the Transpose operator. Combining the example in FIG. 1, that is, the software configured parameter indicates that the tensor operation of the operator is replaced by a mode of reading elements from the addresses in the memory according to the tensor operation of the Transpose operator.

In an embodiment, the parameter that is configured by software includes: a value representing the number of addresses spaced between an address of a first element read in a first step and an initial address of the input tensor in the memory in respective layers of read loops, a value representing the number of steps of reading in one read loop, and a value representing a stride between respective steps within one-layer read loop. It should be noted that the stride here is similar to pace/stride in the concept of neural network.

In this embodiment, if there is only one read loop, the software configured parameter only needs to inform a start address, the total number of elements to be read, and the number of addresses spaced between respective elements during each read. That is, only 3 parameters are required.

For example, an operation of a Gather operator is assumed to be performed. The operation of the Gather operator is: selecting some numerical values among numerical values in an input tensor as an output tensor. It may be seen that the operation of the Gather operator is a tensor operation without changing the numerical values in the input tensor. In this case, the input tensor is [1,2,3,4,5,6,7,8], and the operation of the Gather operator is assumed to be: selecting [1,3,5,7] from [1,2,3,4,5,6,7,8].

In the existing technology, in order to complete the operation of the Gather operator, the chip firstly needs to continuously store the input tensor [1,2,3,4,5,6,7,8] in the memory as memory addresses (hexadecimal): for example, 00000001, 00000002, 00000003, 00000004, 00000005, 00000006, 00000007, 00000008; then, the computing unit of the chip performs the operation of the Gather operator to obtain [1,3,5,7], and then stores [1,3,5,7] as addresses (hexadecimal): for example, 00000009, 000000010, 00000011, 00000012. Then the chip continues to perform further operator operations on the result [1,3,5,7] through the computing unit.

However, through this embodiment, the address computing module may directly compute the addresses of 1, 3, 5, 7 from the input tensor [1,2,3,4,5,6,7,8] through the software configured parameter, and read [1,3,5,7] from these addresses to execute further operator operations on the result [1,3,5,7] through the computing unit. Specifically, the parameter that is configured by software may include: a value 4 representing the number of steps of reading in one read loop (representing a total of 4 reads), and a value 2 representing a stride between respective steps within one-layer read loop (representing 2 addresses added after each read before proceeding to a next read).

Therefore, according to these parameters, the address computing module may compute an order of addresses to be read as: 00000001, 00000003, 00000005, 00000007 (starting from address 00000001, adding 2 addresses for each read before proceeding to a next read, for a total of 4 reads). The computing unit correspondingly reads the addresses stored in the positions 00000001, 00000003, 00000005, 00000007 in the computed address order, namely 1, 3, 5, 7.

In this way, the software configured parameter is used to cause the computing unit to correspondingly read the addresses stored in the positions 00000001, 00000003, 00000005, 00000007 in the computed address order, namely 1, 3, 5, 7, so as to directly replace the operation of the Gather operator, and save time and hardware costs of computing the operation of the Gather operator, time and hardware costs of storing the result tensor of the operation of the Gather operator, and time and hardware costs of reading out the respective elements from the addresses storing the result tensor of the operation of the Gather operator in the existing technology.

Multi-layer read loop nest may by adopted for more complex and flexible read forms. In an embodiment, the parameter that is configure by software may include: a value representing the number of steps of reading in respective layers of read loops, and a value representing a stride between respective steps in respective layers of read loops, wherein the respective layers of read loops are performed from an outer layer to an inner layer in a nested manner. In an embodiment, the parameter that is configure by software may further include: a value representing the number of addresses spaced between an address of a first element read in a first step in the respective layers of read loops and an initial address of an input tensor in the memory. In this way, the read mode may be more flexible.

In this embodiment, multi-layer read loop nest is adopted. The loop nest refers to: firstly executing one loop of the outer layer, then executing the loop of the inner layer, next, entering a second loop of the outer layer, and executing one loop of the inner layer again. The above-described outer-layer loop and inner-layer loop is an example of 2-layer loop nest. For example, when reading a two-dimensional matrix, the outer-layer loop may control reading which column, and the inner-layer loop may control reading which row in a certain column. In C language, multi-layer read loop nest may be executed by using a multi-layer "for" loop nest statement.

For example, combining the example in FIG. 1, an example of 2-layer loop nest is given. The input tensor is assumed to be $$\begin{bmatrix} 1 & 2 & 3 \\ 4 & 5 & 6 \\ 7 & 8 & 9 \\ 10 & 11 & 12 \end{bmatrix},$$

which is usually continuously stored in the memory of the storage unit inside the chip, that is, stored as 1, 2, 3, 4, 5, 6, 7, 8, 9, 10, 11, 12 (e.g., memory addresses (hexadecimal) are, for example, 00000001, 00000002, 00000003, 00000004, 00000005, 00000006, 00000007, 00000008, 00000009, 00000010, 00000011, 00000012).

To replace the operation of the Transpose operator, that is, to sequentially read 1, 4, 7, 10, 2, 5, 8, 11, 3, 6, 9, 12, a 2-layer read loop may be set. It is assumed that a first-layer read loop is an inner-layer loop, and a second-layer read loop is an outer-layer loop. That is, in the present disclosure, with respect to multi-layer loop nest, a larger number represents a loop of an outer layer, and a smaller number represents a loop of an inner layer.

The software configured parameter may include: a value representing the number of steps of reading in respective layers of read loops (step count of a second-layer (outer-layer) read loop is 3, that is, traversing column 3 of the tensor, and step count of a first-layer (inner-layer) read loop is 4, that is, traversing all rows in a column), and a value representing a stride between respective steps in respective layers of read loops (a stride between respective steps in the second-layer read loop is 1, that is, in a first step, read starts from 00000001, and in a second step, read starts from 00000001 plus 1 address which is equal to 00000002; a stride between respective steps in the second-layer read loop is 3, that is, in a first step, read starts from 00000001, and in a second step, read starts from 00000001 plus 3 addresses which is equal to 00000004), wherein the respective layers of read loops are performed from an outer layer to an inner layer in a nested manner.

Assuming that a pseudocode of 2-layer read loop nest is, for example, as follows:

For loop_1 from 1 to loop_1_cnt_max
For loop_0 from 1 to loop_0_cnt_max

Where, loop_1 represents a second-layer read loop, and loop_0 represents a first-layer read loop. And according to the above-described parameter settings, loop_1_cnt_max is 3, loop_0_cnt_max is 4.

So, next, the address computing module reads from the memory addresses 00000001, 00000002, 00000003, 00000004, 00000005, 00000006, 00000007, 00000008, 00000009, 00000010, 00000011, 00000012 that store 1, 2, 3, 4, 5, 6, 7, 8, 9, 10, 11, 12, according to these software configured parameters.

Specifically, according to the software configured parameters, in the second-layer read loop, it is assumed that a compiler has computed an initial address for reading; in this example, for example, an initial address of the input tensor stored in the memory is 00000001; in the second-layer read loop, read starts from 00000001. All steps of the first-layer read loop are executed in the first step of the second-layer read loop. That is, in the 4 steps in the first-layer read loop, 4 reads are performed with a stride of 4 addresses; that is, in the first step of the second-layer read loop, the address computing module computes the read addresses as 00000001, 00000004, 00000007, 00000010; so elements to be read in the first step of the second-layer read loop are 1, 4, 7, 10 respectively stored at addresses 00000001, 00000004, 00000007, 00000010.

A stride between an initial address of a second step and an initial address of the first step in the second-layer read loop is 1, that is, read starts at 00000001 plus 1 address, that is, read starts at address 00000002. All steps of the first-layer read loop are executed in the second step of the second-layer read loop. That is, in the 4 steps of the first-layer read loop, 4 reads are performed with a stride of 4 addresses, that is, in the second step of the second-layer read loop, the address computing module computes the read addresses as 00000002, 00000005, 00000008, 00000011, so elements to be read in the second step of the second-layer read loop are 2, 5, 8, 11 respectively stored at addresses 00000002, 00000005, 00000008, 00000011.

A stride between an initial address of a third step and the initial address of the second step in the second-layer read loop is 1, that is, read starts at 00000002 plus 1 address, that is, read starts at address 00000003. All steps of the first-layer read loop are executed in the third step of the second-layer read loop. That is, in the 4 steps of the first-layer read loop, 4 reads are performed with a stride of 4 addresses, that is, in the third step of the second-layer read loop, the address computing module computes read addresses 00000003, 00000006, 00000009, 00000012, so in the third step of the second-layer read loop, elements to be read are 3, 6, 9, 12 respectively stored at addresses 00000003, 00000006, 00000009, 00000012.

Therefore, according to these software configured parameters, an order of the addresses computed by the address computing module is 00000001, 00000004, 00000007, 00000010, 00000002, 00000005, 00000008, 00000011, 00000003, 00000006, 00000009, 00000012, so the elements sequentially read from these addresses are 1, 4, 7, 10, 2, 5, 8, 11, 3, 6, 9, 12.

According to these software configured parameter, step count in the second-layer read loop is 3, so the address computing module may stop after executing the second-layer read loop three times and address computation of a first-layer read loop within each second-layer read loop.

In this embodiment, the software configured parameter may also be used to configure the case where there is only 1 loop, for example, step count in the second-layer read loop is set to 1, that is, all steps of the first-layer read loop is executed only once.

In addition, the value of the above-described specific parameter is only an example, that is, a number is used to directly represent implication thereof, but it is not limitative. Other numerical value or content other than number may be used to represent implication thereof, or, for example, 0 may also be used to represent a stride or step count being 1 (because a chip usually starts counting from 0, etc.), or A may also be used to represent a stride or step count being 1, and so on, as long as the chip can deduce corresponding implication of the value.

In this way, various tensor operations can be directly replaced by the software configured parameter cooperating with the address computing module to compute addresses. Moreover, an address computation process of more than one loop nest is set, which can make the read address computed by the address computing module more flexible, without being limited to the sequential addresses per se storing the respective numerical values of the input tensor. In addition, operations of operators can be directly replaced, to save time and hardware costs of computing the operations of the operators, time and hardware costs of storing the result tensor of the operations of the operators, and time and hardware costs of reading out respective elements from the addresses storing the result tensor of the operations of the operators in the existing technology, so as to reduce computation latency, reduce hardware computation costs, and improve operational efficiency of the chip.

The software configured parameter is used for cooperating with the address computing module to compute addresses, which may not only allow computation of address sequences arranged more flexibly, but also replace various tensor operations. In an embodiment, the replaced tensor operation may be tensor manipulation without changing the numerical values in the input tensor, wherein the address computing module computes an address in the memory to be read each time in one-layer read loop or multi-layer read loop nest according to the configured parameter received through the interface, so that the tensor operation is replaced by reading.

In an embodiment, the tensor operations may include: operation of transpose operator, operation of reshape operator, operation of broadcast operator, operation of gatherer operator, operation of reverse operator, operation of concat operator, operation of cast operator, and so on. Of course, there are operations of many other types of operators that may also be flexibly implemented through the address computing module and the software configured parameter according to the embodiments of the present disclosure.

Of course, the software configured parameter is used for cooperating with the address computing module to compute addresses, which may not only replace specific tensor operations, but also compute the addresses to be read in various flexible ways, so as to implement flexible read functions beyond the inherent limitations of sequential reading in hardware per se.

Hereinafter, specific application in practical scenarios is described in combination with a specific chip hardware example and a parameter example.

FIG. 3 shows a schematic diagram of decomposition of the processor chip for flexibly accessing data according to the embodiment of the present disclosure.

FIG. 3 shows internal units and parameters used in a process engine (PE) 300 of the processor chip.

The process engine 300 may include a configuring unit 301, a computing unit 302, and a storage unit 303. The storage control unit 304 is used for configuring the computing unit 302 and the storage unit 303; the computing unit 302 is mainly used in convolution/matrix computation/vector computation, etc.; the storage unit 303 includes an on-chip SRAM memory 3031 (with a size of, for example, 8 MB, which is not limitative), and a memory access control module 3032, used in exchange of internal data and external data of the process engine 300 and accessing data of the computing unit 302 within the process engine 300.

The process engine 300 further includes a storage control unit 304, and the storage control unit 304 implements specific functions as follows:

a sram_read function is used for reading data from the SRAM 3031 and sending the same to the computing unit 302 for computations of the read data, for example, tensor operations such as convolution/matrix computation/vector computation;

a sram_write function is used for acquiring computation result data from the computing unit 302, and writing and storing the same to the SRAM 3031;

a sram_upload function is used for moving the data stored in the SRAM 3031 to the outside of the process engine 300 (e.g., to other process engine or DRAM); and a sram_download function is used for downloading data from outside the process engine 300 (data from other process engine or DRAM) to the SRAM 3031.

That is to say, the sram_upload function and the sram_download function are used for data exchange with a device outside the process engine 300. The sram_read function and the sram_write function are used for data interaction between the computing unit 302 and the storage unit 303 within the process engine 300.

The SRAM 3031 is a shared memory within the process engine 300, with a size not limited to 8 MB, and is mainly used for storing intermediate data within the process engine 300 (including data to be computed and computed results). The SRAM 3031 can be divided into a plurality of banks to improve overall data bandwidth.

A crossbar 3041 is a fully interconnected structure of the storage control access interface and the SRAM multi-banks inside the process engine 300. The crossbar 3041, together with the memory access control module 3032 of the storage unit 303, controls reading the elements at the addresses from the SRAM memory 3031 in the storage unit 303 through the addresses computed by the address computing module 3042.

It can be seen that computing pipeline (the computing unit 302) and data pipeline (the storage unit 303) of the entire process engine 300 are configured separately. One computation of an operator requires cooperation of a plurality of modules. For example, one computation of convolution requires configuring sram_read to input feature data to the computing unit 302, configuring sram_read to input weights to the computing unit 302, performing matrix convolution computation by the computing unit 302, and configuring sram_write to output the computation results to the SRAM memory 3031 in the storage unit 303. In this way, selection of computation modes is more flexible.

Specifically, the storage control unit 304 is configured to control reading data from the memory 3031 according to the tensor operation of the operator, and send the same to the computing unit. The storage control unit 304 includes an address computing module 3042. The address computing module 3042 has an interface for receiving the software configured parameter data_noc. The address computing module 3042 computes addresses in the memory 3031 in one-layer read loop or multi-layer read loop nest according to the configured parameter, so as to read elements from the computed addresses and send the same to the computing unit 302.

Most of computations are addressed regularly, for example, with respect to computations such as matrix multiplication, full connection, convolution, etc., data is read regularly from the addresses storing the tensor. Therefore, it can be considered to implement various complex address computations through software configured parameter.

In an embodiment, if only one read loop is set, the parameter that is configured by software includes: a value representing the number of steps of reading in one read loop, and a value representing a stride between respective steps in one-layer read loop.

In an embodiment, if a plurality of read loop nests are set, the parameter that is configured by software includes: a value representing the number of steps of reading in respective layers of read loops, and a value representing a stride between respective steps in respective layers of read loops. The respective layers of read loops are performed from an outer layer to an inner layer in a nested manner.

The above-described setting of a plurality of read loop nests can implement multiple reads of an address storing a same tensor or a same segment of address, thereby implementing various complex address computations to more flexibility reading the address.

For example, in a mode of adopting 8-layer loop nest (sequentially loop_7 to Loop_0 from an outer-layer loop to an inner-layer loop), the pseudocode thereof is as follows:

```
For loop_7 from 1 to loop_7_cnt_max
  For loop_6 from 1 to loop_6_cnt_max
    For Loop_5 from 1 to loop_5_cnt_max
      For Loop_4 from 1 to loop_4_cnt_max
        For Loop_3 from 1 to loop_3_cnt_max
          For Loop_2 from 1 to loop_2_cnt_max
            For Loop_1 from 1 to loop_1_cnt_max
              For Loop_0 from 1 to loop_0_cnt_max
```

The following parameters related to addressing are configured in the register: a value loop_xx_cnt_max representing the number of steps of reading in respective layers of read loops (where xx represents an xx-th read loop), and a value jump_xx_addr representing a stride between respective steps in respective layers of read loops (where xx represents an xx-th read loop).

The above-described 8-layer read loop runs as follows: firstly, a total of loop_7_cnt_max steps in a loop of layer Loop7 are run; in each step of the loop of layer Loop7, a total of loop_6_cnt_max steps in a loop of layer Loop6 are run; in each step of the loop of layer Loop6, a total of loop_5_cnt_max steps in a loop of layer Loop5 are run; in each step of the loop of layer Loop5, a total of loop_4_cnt_max steps in a loop of layer Loop4 are run; in each step of the loop of layer Loop4, a total of loop_3_cnt_max steps in a loop of layer Loop3 are run; in each step of the loop of layer Loop3, a total of loop_2_cnt_max steps in a loop of layer Loop2 are run; in each step of the loop of layer Loop2, a total of loop_1_cnt_max steps in a loop of layer Loop1 are run; and in each step of the loop of layer Loop1, a total of loop_0_cnt_max steps in a loop of layer Loop0 are run. It can be seen that, the loop of the base layer Loop0 runs a total of loop_0_cnt_max*loop_1_cnt_max*loop_2_cnt_max*loop_3_cnt_max*loop_4_cnt_max*loop_5_cnt_max*loop_6_cnt_max*loop_7_cnt_max steps, and a loop of an upper layer Loop1 runs a total of loop_1_cnt_max*loop_2_cnt_max*loop_3_cnt_max*loop_4_cnt_max*loop_5_cnt_max*loop_6_cnt_max*loop_7_cnt_max steps. An so on, the loop of the top layer Loop7 runs a total of loop_7_cnt_max steps.

It can be seen that the eight layers of nested loops as set above may be seen as a multiplication relationship from the base layer to the top layer from an abstract perspective, that is, the number of loops in the base layer is equal to the product of the numbers of loops in all upper layers.

An example of performing 2-layer loop nest read on a tensor in a 2-dimensional space is provided, as shown in FIG. 4. FIG. 4 shows an example of performing 2-layer loop nest read on an input tensor according to the embodiments of the present disclosure.

The input tensor is assumed to be $$\begin{bmatrix} 0 & 1 & 2 \\ 3 & 4 & 5 \\ 6 & 7 & 8 \\ 9 & 10 & 11 \\ 12 & 13 & 14 \\ 15 & 16 & 17 \end{bmatrix},$$

and the numbers in the box of FIG. 4 represent addresses of SRAM storing respective elements of the input tensor (for convenience of explanation, the addresses storing the elements are directly written as numbers corresponding to the elements per se). It is assumed that the addresses to be read (accessed) through the software configured parameter are gray blocks in FIG. 4, and the read order is 0-2-4-6-9-11-13-15.

Then base_address is a start address, which may be pre-computed by the compiler and is usually an initial address in a segment of addresses where the input tensor is stored in the SRAM (i.e., a location where a first element is stored, which is address 0 in this example). A parameter loop_0_cnt_max=4 is configured by software, which indicates that step count in a first-layer (inner-layer) read loop is 4 or a size of the loop is 4. Another parameter jump0_addr=2 is configured by software, which indicates that a stride between respective steps in the first-layer read loop is 2. Another parameter loop_1_cnt_max=2 is configured by software, which indicates that step count in a second-layer (outer-layer) read loop is 2 or a size of the loop is 2. Another parameter jump1_addr=9 is configured by software, which indicates that a stride between respective steps in the second-layer read loop is 9.

The pseudocode is as follows:
   For loop_1 from 1 to 2
   For loop_0 from 1 to 4

A corresponding counter loop_xx_cnt is set for each read loop (xx represents an xx-th read loop), for example, loop_0_cnt sequentially increases from 1 to 4, for example, loop_1_cnt sequentially increases from 1 to 2.

According to the above-described configured parameters, combining with FIG. 5 (FIG. 5 shows a schematic diagram of computing an address according to the software configured parameter according to the embodiment of the present disclosure, where, sram_addr represents addresses 0 to 15 stored in SRAM), the address computing module computes the addresses as follows.

Firstly, running a 1-st step (in a total of 2 steps) of the second-layer (outer-layer) read loop loop_1, starting from the base_address initial address 0, running a 1-st step (e.g., 0_0 in FIG. 5, in a total of 4 steps) of the first-layer (memory) read loop loop_0, and reading element 0 from address 0. The parameter jump0_addr=2 representing a stride of 2 between respective steps in the first-layer read loop, running a 2-nd step (e.g., 0_1 in FIG. 5, in a total of 4 steps) of the first-layer (memory) read loop loop_0, reading element 2 from address 2 (address 0+2), running a 3-rd step (e.g., 0_2 in FIG. 5, in a total of 4 steps) of the first-layer (memory) read loop loop_0, reading element 4 from address 4 (address 2+2), running a 4-th step (e.g., 0_3 in FIG. 5, in a total of 4 steps) of the first-layer (memory) read loop loop_0, and reading element 6 from address 6 (address 4+2); and then completing the 4 steps of the first-layer (memory) read loop loop_0.

Next, running a 2-nd step (in a total of 2 steps) of the second-layer (outer-layer) read loop loop_1. The parameter jump1_addr=9 representing a stride of 9 between respective steps in the second-layer read loop, as shown by an arrow in FIG. 5, starting from address 9 obtained from the base_address initial address 0+9, running a 1-st step (e.g., 1_0 in FIG. 5, in a total of 4 steps) of the first-layer (memory) read loop loop_0, and reading element 9 from address 9. The parameter jump0_addr=2 representing a stride of 2 between respective steps in the first-layer read loop, running a 2-nd step (e.g., 1_1 in FIG. 5, in a total of 4 steps) of the first-layer (memory) read loop loop_0, reading element 11 from address 11 (address 9+2), running a 3-rd step (e.g., 1_2 in FIG. 5, in a total of 4 steps) of the first-layer (memory) read loop loop_0, reading element 13 from address 13 (address 11+2), running a 4-th step (e.g., 1_3 in FIG. 5, in a total of 4 steps) of the first-layer (memory) read loop loop_0, and reading element 15 from address 15 (address 13+2). And then the 4 steps of the first-layer (memory) read loop loop_0 are completed.

So far, the total of 2 steps of the second-layer (outer-layer) read loop loop_1 have been executed, and the address computing module terminates address computation and address reading. So, an order of reading the elements is 0-2-4-6-9-11-13-15.

Of course, in an embodiment, the parameter that is configured by software may also include: a value representing the number of addresses spaced between an address of a first element read in one-layer read loop and an initial address of an input tensor in the memory. In this way, the initial address of each layer of read loop can also be flexibly configured.

It can be seen that elements can be flexibly read from the address of SRAM through configuring corresponding parameters of the above-described 2-layer read loop nest by software.

Similarly, a mechanism with more than 2 layers of read loop nests may be adopted, which is not limited here.

It is assumed that the eight layers of nested loops are set as described above, it may be seen as a multiplication relationship from the base layer to the top layer from an abstract perspective, that is, the number of loops in the base layer is equal to the product of the numbers of loops in all upper layers. This is a completely aligned mode, that is, each nest loop layer follows a certain rule, so the read addresses also follow a certain rule.

However, for certain special scenarios, there may be an incompletely aligned case, for example, with respect to an address read order, one segment of addresses may follow a first rule, another segment of addresses may follow a second rule that may be different from the first rule. Thus, 2 different nest loop modes may be present. In such case, the software configured parameter may include a condition specific to the parameter, and the parameter may have different values in the case where the condition is met and in the case where the condition is not met.

In an embodiment, the parameter is a value representing the number of steps of reading in a specific layer of read loop, and the condition is which step it proceeds to in read loop of a layer more outer than the specific layer. For example, one configuration can be added to a specified read loop and bound to another read loop to resolve the unaligned case. For example, if a read loop for Loop5 read loop is selected, then there are 2 types of configurations loop_1_cnt_max0 and loop_1_cnt_max1 with different step counts for Loop1 read loop, for linkage to the loop_5 read loop.

```
For loop_7 from 1 to loop_7_cnt_max
  For loop_6 from 1 to loop_6_cnt_max
    For Loop5 from 1 to loop_5_cnt_max
      For Loop4 from 1 to loop_4_cnt_max
        For Loop3 from 1 to loop_3_cnt_max
          For Loop2 from 1 to loop_2_cnt_max
          {
          if(loop_5_cnt==loop_5_cnt_max)
            For Loop1 from 1 to loop_1_cnt_max_1
          else
            For Loop1 from 1 to loop_1_cnt_max_0
          }
            For Loop0 from 1 to loop_0_cnt_max
```

That is to say, the software configured parameter may include a condition (loop_5_cnt==loop_5_cnt_max) specific to the parameter (a value representing the number of steps in the read loop of layer Loop1, that is, loop_1_cnt_max), and the parameter loop_1_cnt_max has different values loop_1_cnt_max_1 and loop_1_cnt_max_0 in the case where the condition is met (it proceeds to the last step in the read loop of layer Loop5 that is outer than the read loop of layer Loop1, that is, loop_5_cnt==loop_5_cnt_max) and in the case where the condition is not met (loop_5_cnt< >loop_5_cnt_max).

That is, when running to Loop5, Loop1 is run at least once in each step of Loop5; if Loop5 does not run to the last step, that is, loop_5_cnt< >loop_5_cnt_max, then step count of Loop1 running in the step of Loop5 is always loop_1_cnt_max_0. If Loop5 runs to the last step, that is, loop_5_cnt==loop_5_cnt_max, then step count of Loop1 running in the step of Loop5 is always loop_1_cnt_max_1.

In this way, the mode of computing the address for reading can be more flexible.

Figures 6, 7:
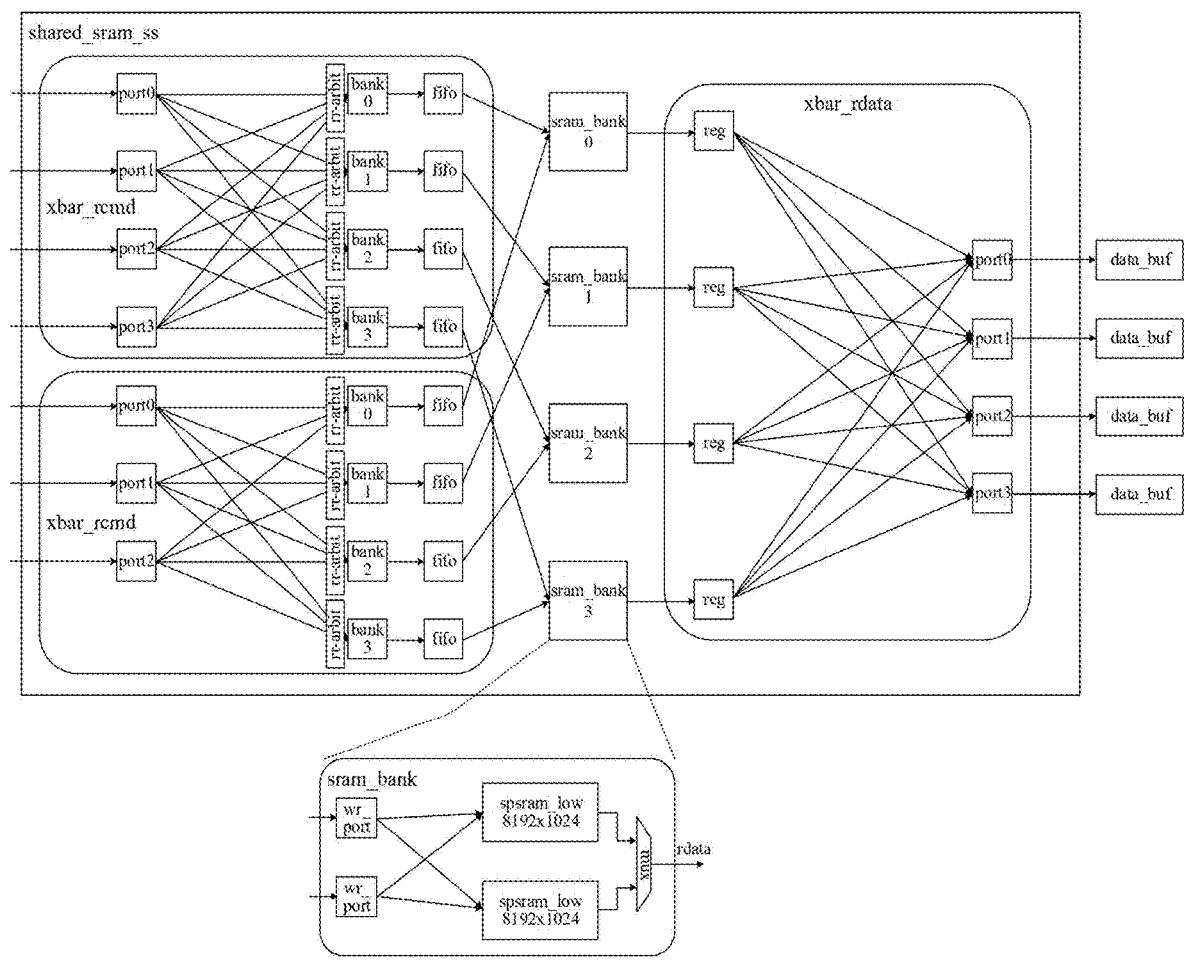
FIG. 6 shows an example of performing incompletely aligned 3-layer loop nest read on an input tensor according to an embodiment of the present disclosure.
FIG. 7 shows a schematic diagram of an internal structure of SRAM according to an embodiment of the present disclosure.

An example of performing incompletely aligned 3-layer loop nest read on a tensor in a 2-dimensional space is provided, as shown in FIG. 6. FIG. 6 shows an example of performing incompletely aligned 3-layer loop nest read on an input tensor according to the embodiments of the present disclosure.

The input tensor is assumed to be $$\begin{bmatrix} 0 & 1 & 2 \\ 3 & 4 & 5 \\ 6 & 7 & 8 \\ 9 & 10 & 11 \\ 12 & 13 & 14 \\ 15 & 16 & 17 \\ 18 & 19 & 20 \\ 21 & 22 & 23 \end{bmatrix},$$

stored in addresses in SRAM as shown in FIG. 6. The numbers in the box of FIG. 6 represent the addresses of SRAM storing respective elements of the input tensor (the addresses storing the elements are directly written as numbers corresponding to the elements per se, for convenience of explanation). It is assumed that the addresses to be read (accessed) through the software configured parameter are gray blocks in FIG. 6, and a read order is 0-8-1-9-2-10-3-11-4-12-16-17-18-19-20.

It can be seen that 0-8-1-9-2-10-3-11-4-12 are read in a completely aligned mode following a certain rule, while 16-17-18-19-20 are read in a mode incompletely aligned with the mode in which 0-8-1-9-2-10-3-11-4-12 are read, which follows another rule. In this case, it is considered to use the software configured parameter to implement incompletely aligned loop nest read.

Specifically, 3-layer loop nest (Loop2, Loop1, Loop0) is set to compute the addresses to be read and implement the above-described read order.

The software configured parameters may be: 2 as step count loop_2_cnt_max of a top layer Loop2, 16 as a stride jump2_addr; 5 as step count loop_1_cnt_max of a lower layer Loop1, 1 as a stride jump1_addr; 2 as step count loop_0_cnt_max_0 of a base layer Loop0, and 8 as a stride jump0_addr; then configuration designates that Loop2 is bound to Loop0; and a condition is set that when Loop2 proceeds to the last step (loop_2_cnt==loop_2_cnt_max), step count of Loop0 changes from loop_0_cnt_max_0 to loop_0_cnt_max_1, that is, changes from 2 to 1.

The step count loop_2_cnt_max of the top layer is set to 2 in consideration that the read order of 0-8-1-9-2-10-3-11-4-12 is executed in the 1-st step, and the read order of 16-17-18-19-20 is executed in the 2-nd step. Since the 2 steps are executed in different orders and according to different rules, it is needed to consider how the middle-layer read loop Loop1 and the base-layer read loop Loop0 cooperate in the 2-nd step to implement different read orders.

Specifically, according to the above-described software configured parameters, the three layers of loop nest are run to compute addresses as follows.

Firstly, executing a 1-st step (in a total of 2 steps) of the top-layer Loop2, and in the 1-st step, running 5 steps of Loop1.

In the 1-st step of Loop1, running all steps of Loop0, that is, starting from 0, running 2 steps, a stride of each step being 8, so firstly reading 0, and then adding 8 addresses to read 8, so as to read 0-8 in such 2 steps.

In a 2-nd step of Loop1, a stride being 1, that is, starting from 1, running all steps of Loop0, that is, starting from 1, running 2 steps, a stride of each step being 8, so firstly reading 1, and then adding 8 addresses to read 9, so as to read 1-9 in such 2 steps.

In a 3-rd step of Loop1, a stride being 1, that is, starting from 2, running all steps of Loop0, that is, starting from 2, running 2 steps, a stride of each step being 8, so firstly reading 2, then adding 8 addresses to read 10, so as to read 2-10 in such 2 steps.

In a 4-th step of Loop1, a stride being 1, that is, starting from 3, running all steps of Loop0, that is, starting from 3, running 2 steps, a stride of each step being 8, so firstly reading 3, then adding 8 addresses to read 11, so as to read 3-11 in such 2 steps.

In a 5-th step of Loop1, a stride being 1, that is, starting from 4, running all steps of Loop0, that is, starting from 4, running 2 steps, a stride of each step being 8, so firstly reading 4, then adding 8 addresses to read 12, so as to read 4-12 in such 2 steps.

Then, executing a 2-nd step (in a total of 2 steps) of the top-layer Loop2, starting from the initial address 9 and adding a stride of 16, that is, reading from 16.

At this time, the condition loop_2_cnt==loop_2_cnt_max is met. Therefore, step count for Loop0 is loop_0_cnt_max_1, which is no longer 2 steps, but instead, 1 step. In the 2-nd step, running 5 steps of Loop1, and in each step of Loop1, running Loop0 read loop whose step count is 1.

Specifically, in a 1-st step of Loop1, running all steps of Loop0, that is, starting from 16, running 1 step, which represents read only once, and then the stride 8 is no longer used, so reading only 16.

In a 2-nd step of Loop1, a stride being 1, that is, starting from 16+1=17, running 1 step of Loop0, so reading 17.

In a 3-rd step of Loop1, a stride being 1, that is, starting from 17+1=18, running 1 step of Loop0, so reading 18.

In a 4-th step of Loop1, a stride being 1, that is, starting from 18+1=19, running 1 step 1 of Loop0, so reading 19.

In a 5-th step of Loop1, a stride being 1, that is, starting from 19+1=20, running 1 step of Loop0, so reading 20.

In this way, the software configured parameters allow the 3-layer read loop nest to implement a complex address read order 0-8-1-9-2-10-3-11-4-12-16-17-18-19-20.

Of course, the above describes only an example of setting a condition of which step it proceeds to in read loop of a layer more outer than a specific layer, and then respectively setting different step counts in read loop of the specific layer in the case where the condition is met and in the case where the condition is not met. However, the present disclosure is not limited thereto. Other conditions and changes in other parameters that meet the condition may be considered to more flexibly implement a more complex address read order.

Therefore, the software configured parameter according to the present disclosure can allow the addresses in the memory to be computed flexibly, to read elements from the computed addresses and send the same to the computing unit, so as to implement a flexible address reading mode, increase computational efficiency and reduce costs of the processor chip, which, in some cases, may also replace the specific tensor operation per se in computations, so as to simplify operations of operators.

With respect to specific address computation of read loop nest, in an embodiment, the address to be read currently is computed according to the step it currently proceeds to in one-layer read loop or respective layers of read loops as well as respective strides of one-layer read loop or respective layers of read loops.

Specifically, with respect to address computation of an address to be ultimately read from SRAM, according to above-described parameter that is configured by software, the address computing unit may compute an address Address read each time in a mode similar to an approach of determining a position of a point in a multi-dimension (read loop) spatial coordinate system:

$$Address = base\_address + offset\_address\_dim;$$

the base_address may be pre-computed by the compiler, which is usually an initial address in a segment of addresses where an input tensor is stored in SRAM (i.e., a position where a first element is stored), while offset_address_dim is a sum of address offsets of respective dimensions (read loop):

$$offset\_address\_dim = offset\_addr\_0 + offset\_addr\_1 + offset\_addr\_2 + offset\_addr\_3 + offset\_addr\_4 + offset\_addr\_5 + offset\_addr\_6 + offset\_addr\_7$$

Where, offset_addr_xx represents an offset of an initial address of an xx-th-layer read loop relative to an initial address of an upper-layer read loop (or relative to base_address in the case of the top-layer read loop). That is, offset_address_xx=(loop_xx_counter−1)*jump_xx_addr for each dimension, where, loop_xx_counter represents which step it currently proceeds in the xx-th-layer read loop.

That is to say, when the address computing module computes the address in practice, it only needs to know which step it currently proceeds in one-layer read loop or respective layers of read loops as well as respective strides of one-layer read loop or respective layers of read loops, so as to determine the address that needs be read currently.

FIG. 7 shows a schematic diagram of an internal structure of SRAM according to the embodiments of the present disclosure.

Additionally, SRAM may also be divided into a plurality of banks. In order to increase speed of data writing and reading, data written from external sources may be directly placed in different banks; and read-in data, intermediate computation data, and result data may also be directly placed in different banks. An addressing mode in SRAM is also configurable. By default, a highest bit of an address may be used to distinguish different banks, and interleaving of other granularities may also be performed through configurable address hashing. From a perspective of hardware design, a multi-bit bank selection signal bank_sel is ultimately generated for data of respective ports such as port0, port1, port2, port3, etc. to select different SRAM banks sram_bank (sram_ bank0 to sram_bank3, etc.).

Handshake signals may be adopted for multi-port access, and the data pipeline supports backpressure (when inlet flow is greater than outlet flow, backpressure is required, or, when a downstream stage is not ready, if the present stage performs data transmission, it needs to backpressure an upstream stage, so the upstream stage needs to keep data stationary until handshake is successful before updating the data). The storage control unit 304 includes a crossbar structure having a read function and a write function that are separated and capable of accessing a plurality of banks of SRAM in parallel, which is equivalent to a cascade mode of 2 stages of crossbar, to alleviate wiring problems in implementing hardware. Single-port SRAM is used in the base-layer memory to save power and area. The crossbar structure may access a plurality of banks that respectively store read-in data, intermediate result data, and final result data in parallel or simultaneously, so as to further accelerate read and write speeds and improve operational efficiency of the chip.

In this way, various tensor operations can be directly replaced by the software configured parameter cooperating with the address computing module to compute addresses. Moreover, an address computation process of more than one loop nest is set, which may make the read address computed by the address computing module more flexible, without being limited to the sequential addresses per se storing the respective numerical values of the input tensor. In addition, operations of operators may be directly replaced, to save time and hardware costs of computing the operations of the operators, time and hardware costs of storing the result tensor of the operations of the operators, and time and hardware costs of reading out respective elements from the addresses storing the result tensor of the operations of the operators in the existing technology, so as to reduce computation latency, reduce hardware computation costs, and improve operational efficiency of the chip.

In summary, by configuring the data pipeline and the computing pipeline separately, the software is fully controllable to maximize flexibility. The addressing mode through multi-layer read loop can implement various complex address access patterns. The mode of multi-layer asymmetric loop can implement non-aligned configuration, so as to implement more complex address access patterns. The shared on-chip memory is split into a plurality of banks, and the addressing mode between banks is maintained through software. By separating the data pipeline from the computing pipeline, flexibility of data access is ensured. Meanwhile, data move and computing pipeline can be hid from each other, to achieve an effect of concurrency of different modules. Through reasonable intermediate data partitioning by the compiler, different banks of SRAM store different types of data, for example, different types of data that can be accessed simultaneously, so that when these pieces of data need to be accessed simultaneously, these pieces of data can be read in parallel from different banks of SRAM, so as to speed up efficiency. After starting computation, the media access control (MAC) address utilization rate of convolutional computation can reach almost 100%.

FIG. 8 shows a flow chart of a method for flexibly accessing data in a processor chip according to the embodiments of the present disclosure.

As shown in FIG. 8, the method 800 for flexibly accessing data in the processor chip includes: step 801, storing, by a memory in the processor chip, read-in tensor data from outside the processor chip, the read-in tensor data including a plurality of elements for performing a tensor operation of an operator included in computation; step 802, controlling reading elements from the memory according to the tensor operation of the operator to send the elements to a computing unit, including: computing addresses in the memory in one-layer read loop or multi-layer read loop nest according to a parameter that is configured by software and is received, so as to read the elements from the computed addresses and send the elements to the computing unit in the processor chip; and step 803, performing, by the computing unit, the tensor operation of the operator by using the elements received.

Thus, the software configured parameter can be used to flexibly compute the addresses in the memory to flexibly read elements in the memory, without being limited to an order of storing these elements or address sorting in the memory.

In an embodiment, the parameter that is configured by software includes: a value representing the number of elements to be read from the read-in tensor data in one-layer read loop, and a value representing a stride between respective steps in one-layer read loop.

In an embodiment, the parameter that is configured by software includes: a value representing the number of steps of reading in respective layers of read loops, and a value representing a stride between respective steps in respective layers of read loops. The respective layers of read loops are performed from an outer layer to an inner layer in a nested manner.

In an embodiment, the parameter that is configured by software includes: a value representing the number of addresses spaced between an address of a first element read in one-layer read loop and an initial address of an input tensor in the memory.

In an embodiment, the parameter that is configured by software includes a condition specific to the parameter, and the parameter has different values in the case where the condition is met and in the case where the condition is not met.

In an embodiment, the parameter is a value representing the number of steps of reading in a specific layer of read loop, and the condition is which step it proceeds to in another layer of read loops outer than the specific layer.

In an embodiment, the method 800 further includes: computing the address to be read currently according to the currently proceeded step in one-layer read loop or respective layers of read loops as well as respective strides of one-layer read loop or respective layers of read loops.

In this way, the mode of computing the address for reading can be more flexible.

In an embodiment, the parameter that is configured by software indicates that the tensor operation of the operator is replaced by a mode of reading elements from the addresses in the memory according to the tensor operation of the operator.

In an embodiment, the tensor operation is tensor manipulation without changing the numerical values in the input tensor. An address in the memory to be read each time is computed in one-layer read loop or multi-layer read loop nest according to the configured parameter received through the interface, so that the tensor manipulation is replaced by reading.

In an embodiment, the tensor operation includes at least one from a group consisting of: operation of transpose operator, operation of reshape operator, operation of broadcast operator, operation of gatherer operator, operation of reverse operator, operation of concat operator, and operation of cast operator.

In this way, the software configured parameter is used to cause the computing unit to correspondingly read addresses stored in the positions of the computed addresses in the computed address order, which can directly replace operations of some tensor operators, so as to save time and hardware costs of computing the operations of these tensor operators, time and hardware costs of storing result tensor of the operations of these tensor operators, and time and hardware costs of reading out the respective elements from the addresses storing the result tensor of the operations of these tensor operators in the existing technology.

In an embodiment, the memory is divided into a plurality of banks for respectively storing data that can be accessed in parallel. The method further includes accessing data stored in the plurality of banks of the memory in parallel through the crossbar having a read function and a write function that are separated.

In this way, various tensor operations can be directly replaced by the software configured parameter cooperating with the computed addresses. Moreover, an address computation process of more than one loop nest is set, which can make the read address computed more flexible, without being limited to the sequential addresses per se storing the respective numerical values of the input tensor. In addition, operations of operators can be directly replaced, to save time and hardware costs of computing the operations of the operators, time and hardware costs of storing the result tensor of the operations of the operators, and time and hardware costs of reading out respective elements from the addresses storing the result tensor of the operations of the operators in the existing technology, so as to reduce computation latency, reduce hardware computation costs, and improve operational efficiency of the chip.

Figure 9:
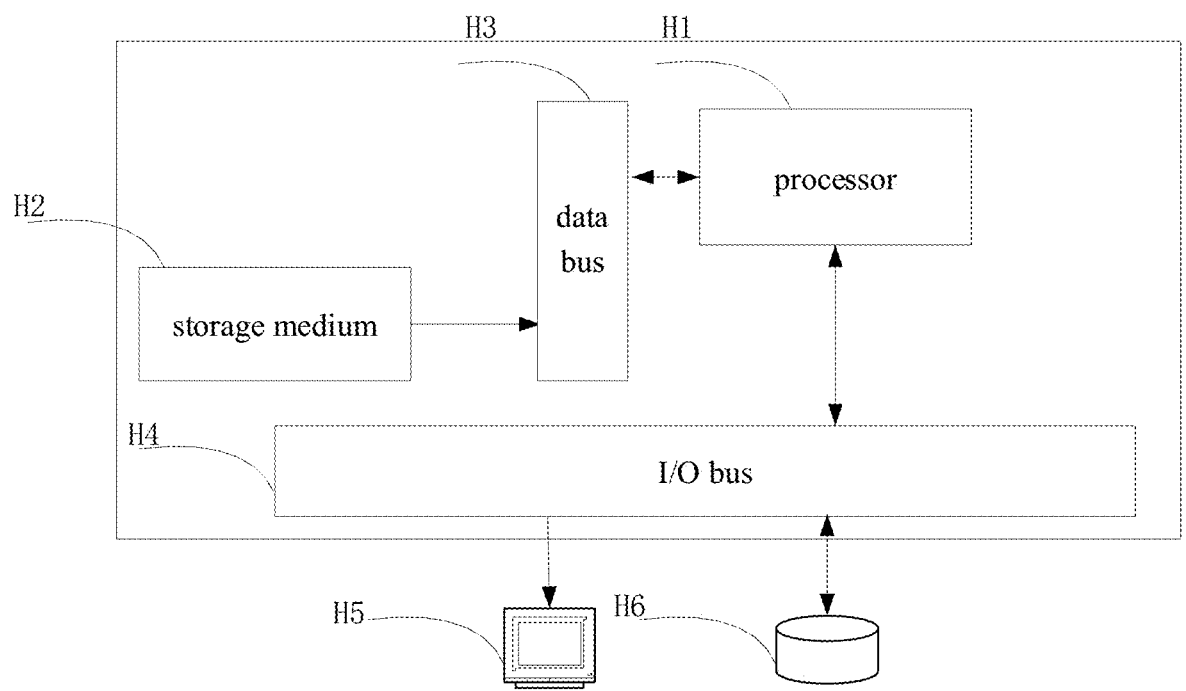
FIG. 9 shows a block diagram of an exemplary electronic device suitable for implementing the embodiments of the present disclosure.

FIG. 9 shows a block diagram of an exemplary electronic device suitable for implementing the embodiments of the present disclosure.

The electronic device may include a processor (H1); and a storage medium (H2), coupled to the processor (H1) and having computer executable instructions stored therein for performing steps of respective methods according to the embodiments of the present disclosure when executed by the processor.

The processor (H1) may include but is not limited to, for example, one or more processors or microprocessors.

The storage medium (H2) may include but is not limited to, for example, a random access memory (RAM), a read-only memory (ROM), a flash memory, an EPROM memory, an EEPROM memory, a register, a computer storage medium (e.g., a hard drive, a floppy disk, a solid-state drive, a removable disk, a CD-ROM, a DVD-ROM, a blue disc, etc.).

In addition, the electronic device may further include a data bus (H3), an input/output (I/O) bus (H4), a display (H5), and an input/output device (H6) (e.g., a keyboard, a mouse, a speaker, etc.).

The processor (H1) may communicate with external devices (H5, H6, etc.) via a wired or wireless network (not shown) through the I/O bus (H4).

The storage medium (H2) may further have at least one computer executable instruction stored thereon, for executing the steps of the respective functions and/or methods according to the embodiments as described in the disclosure when executed by the processor (H1).

In an embodiment, the at least one computer executable instruction may also be compiled into or constitute a software product, and one or more computer executable instructions, when run by the processor, execute the steps of respective functions and/or methods according to the embodiments as described in the disclosure.

Figure 10:
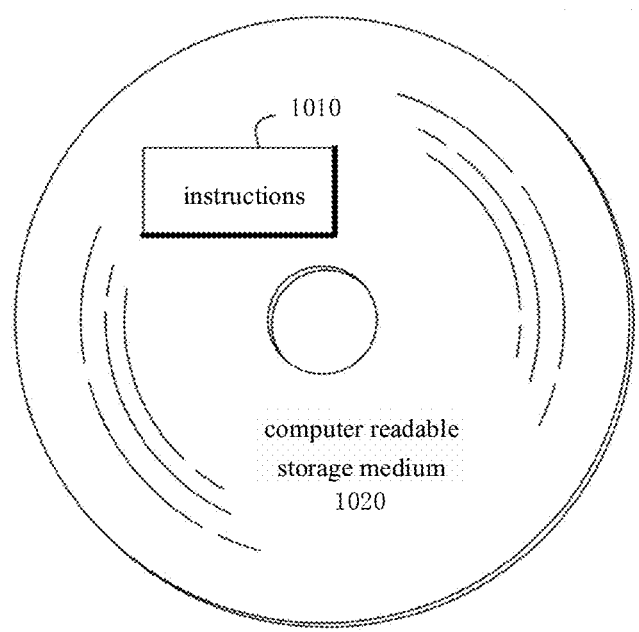
FIG. 10 shows a schematic diagram of a non-transitory computer readable storage medium according to an embodiment of the present disclosure.

FIG. 10 shows a schematic diagram of a non-transitory computer readable storage medium according to an embodiment of the present disclosure.

As shown in FIG. 10, the computer readable storage medium 1020 has instructions stored thereon, and the instructions are, for example, computer readable instructions 1010. The computer readable instruction 1010, when run by a processor, can execute the respective methods as described above. The computer readable storage medium includes but is not limited to, for example, a volatile memory and/or a non-volatile memory. The volatile memory may include, for example, a random access memory (RAM) and/or a cache, or the like. The non-volatile memory may include, for example, a read only memory (ROM), a hard disk, a flash memory, or the like. For example, the computer readable storage medium 1020 may be coupled to a computing device such as a computer; next, in the case where the computing device runs the computer readable instruction 1010 stored on the computer readable storage medium 1020, the above-described respective methods may be executed.

The present disclosure provides following items.

Item 1. A processor chip for flexibly accessing data, comprising:
- a memory, configured to store read-in tensor data from outside the processor chip, the read-in tensor data comprising a plurality of elements for performing a tensor operation of an operator comprised in computation;
- a storage control unit, configured to control reading elements from the memory according to the tensor operation of the operator to send the elements to a computing unit, wherein the storage control unit comprises an address computing module, the address computing module has an interface for receiving a parameter that is configured by software, and the address computing module computes addresses in the memory in one-layer read loop or multi-layer read loop nest according to the parameter configured that is received by the interface, so as to read the elements from computed addresses and send the elements to the computing unit; and
- the computing unit, configured to perform the tensor operation of the operator by using the elements received.

Item 2. The processor chip according to item 1,
- wherein the parameter that is configured by software comprises: a value representing a number of the elements to be read from the read-in tensor data in the one-layer read loop, and a value representing a stride between respective steps in the one-layer read loop; or
- the parameter that is configured by software comprises: a value representing a number of steps of reading in respective layers of read loops, and a value representing a stride between respective steps in respective layers of the read loops, wherein the respective layers of the read loops are performed from an outer layer to an inner layer in a nested manner.

Item 3. The processor chip according to item 1, wherein the parameter that is configured by software comprises: a value representing a number of addresses spaced between an address of a first element read in the one-layer read loop and an initial address of an input tensor in the memory.

Item 4. The processor chip according to item 1, wherein the parameter that is configured by software comprises a condition specific to the parameter, and the parameter has different values when the condition is met and when the condition is not met.

Item 5. The processor chip according to item 4, wherein the parameter is a value representing a number of steps of reading in a specific layer of read loops, and the condition is which step the reading proceeds to in another layer of read loops outer than the specific layer.

Item 6. The processor chip according to any one of items 2 to 5, wherein the address computing module computes an address to be read currently according to a currently proceeded step in the one-layer read loop or the respective layers of the read loops as well as respective strides of the one-layer read loop or the respective layers of the read loops.

Item 7. The processor chip according to item 1, wherein the parameter that is configured by software indicates that the tensor operation of the operator is replaced by a mode of reading the elements from the addresses in the memory according to the tensor operation of the operator.

Item 8. The processor chip according to item 7, wherein the tensor operation is tensor manipulation without changing numerical values in an input tensor, and the address computing module computes an address in the memory to be read each time in the one-layer read loop or the multi-layer read loop nest according to the parameter configured that is received through the interface, so that the tensor manipulation is replaced by reading.

Item 9. The processor chip according to item 8, wherein the tensor operation comprises at least one from a group consisting of: operation of transpose operator, operation of reshape operator, operation of broadcast operator, operation of gatherer operator, operation of reverse operator, operation of concat operator, and operation of cast operator, wherein the memory is divided into a plurality of banks for respectively storing data that is capable of being accessed in parallel, and the storage control unit comprises a crossbar having a read function and a write function that are separated, so as to access the data stored in the plurality of banks of the memory in parallel.

Item 10. A method for flexibly accessing data in a processor chip, comprising:
- storing, by a memory in the processor chip, read-in tensor data from outside the processor chip, the read-in tensor data comprising a plurality of elements for performing a tensor operation of an operator comprised in computation;
- controlling reading elements from the memory according to the tensor operation of the operator to send the elements to a computing unit, comprising: computing addresses in the memory in one-layer read loop or multi-layer read loop nest according to a parameter that is configured by software and is received, so as to read the elements from computed addresses and send the elements to the computing unit in the processor chip; and
- performing, by the computing unit, the tensor operation of the operator by using the elements received.

Item 11. The method according to item 10,
- wherein the parameter that is configured by software comprises: a value representing a number of the elements to be read from the read-in tensor data in the one-layer read loop, and a value representing a stride between respective steps in the one-layer read loop; or
- the parameter that is configured by software comprises: a value representing a number of steps of reading in respective layers of read loops, and a value representing a stride between respective steps in respective layers of the read loops, wherein the respective layers of the read loops are performed from an outer layer to an inner layer in a nested manner.

Item 12. The method according to item 10, wherein the parameter that is configured by software comprises: a value representing a number of addresses spaced between an address of a first element read in the one-layer read loop and an initial address of an input tensor in the memory.

Item 13. The method according to item 10, wherein the parameter that is configured by software comprises a condition specific to the parameter, and the parameter has different values when the condition is met and when the condition is not met.

Item 14. The method according to item 13, wherein the parameter is a value representing a number of steps of reading in a specific layer of read loops, and the condition is which step the reading proceeds to in another layer of read loops outer than the specific layer.

Item 15. The method according to any one of items 11 to 14, further comprising:
- computing an address to be read currently according to a currently proceeded step in the one-layer read loop or the respective layers of the read loops as well as respective strides of the one-layer read loop or the respective layers of the read loops.

Item 16. The method according to item 10, wherein the parameter that is configured by software indicates that the tensor operation of the operator is replaced by a mode of reading the elements from the addresses in the memory according to the tensor operation of the operator.

Item 17. The method according to item 16, wherein the tensor operation is tensor manipulation without changing numerical values in an input tensor, and an address in the memory to be read each time is computed in the one-layer read loop or the multi-layer read loop nest according to the parameter configured that is received through the interface, so that the tensor manipulation is replaced by reading.

Item 18. The method according to item 17, wherein the tensor operation comprises at least one from a group consisting of: operation of transpose operator, operation of reshape operator, operation of broadcast operator, operation of gatherer operator, operation of reverse operator, operation of concat operator, and operation of cast operator, wherein the memory is divided into a plurality of banks for respectively storing data that is capable of being accessed in parallel, and the method further comprises accessing the data stored in the plurality of banks of the memory in parallel through a crossbar having a read function and a write function that are separated.

Item 19. An electronic device, comprising:
a memory, configured to store instructions; and
a processor, configured to read the instructions from the memory and execute the method according to any one of items 10 to 18.

Item 20. A non-transitory storage medium, wherein instructions are stored on the non-transitory storage medium, and
the instructions, when read by a processor, cause the processor to execute the method according to any one of items 10 to 18.

Of course, the above-described specific embodiments are only examples and not limitations, and those skilled in the art may merge and combine some steps and apparatuses from the respective embodiments described separately above according to the concept of the present disclosure to implement the effects of the present disclosure. Such merged and combined embodiments are also included in the present disclosure, and no details will be repeated here.

It should be noted that advantages and effects, etc. mentioned in the present disclosure are only examples and not limitations, and cannot be considered as essential to the respective embodiments of the present disclosure. In addition, the specific details disclosed above are only for the purpose of providing examples and facilitating understanding, and are not limitative. The above details do not limit the necessity for the present disclosure to use the above-described specific details for implementation.

The block diagrams of the devices, apparatuses, equipment and systems involved in the present disclosure are only illustrative examples and are not intended to require or imply that they must be connected, arranged, or configured in the manner shown in the block diagrams. As those skilled in the art will recognize, these devices, apparatuses, equipment and systems may be connected, arranged, and configured in arbitrary modes. Words such as "including", "comprising", "having", etc. are open-ended terms that refer to "including but not limited to" and may be used interchangeably with each other. The terms "or" and "and" used here refer to the words "and/or" and may be used interchangeably with each other, unless the context clearly indicates otherwise. The terms "such as" and "for example" used here refer to the phrase "such as but not limited to" and may be used interchangeably with the latter.

The step flow diagram and the above method description in the present disclosure are only illustrative examples and are not intended to require or imply that the steps of the respective embodiments must be carried out in a given order. As those skilled in the art will recognize, the steps in the above embodiments may be carried out in an arbitrary order. Words such as "after", "then", "next", etc. are not intended to limit the order of steps; these words are only used to guide readers through the description of these methods. In addition, any reference to a singular element using an article such as "a", "an", "one", or "the" is not interpreted as limiting the element to singular.

In addition, the steps and apparatuses according to the respective embodiments here are not limited to be implemented in a certain embodiment. Indeed, new embodiments may be conceived according to the concept of the present disclosure in conjunction with relevant parts of the steps and apparatuses according to the respective embodiments, and these new embodiments are also included within the scope of the present disclosure.

The respective operations of the methods described above may be carried out through any appropriate means that may perform the corresponding functions. The means may include various hardware and/or software components and/or modules, including but not limited to hardware circuits, application specific integrated circuits (ASICs), or processors.

A general-purpose processor, a digital signal processor (DSP), an ASIC, a field programmable gate array (FPGA) signal or other programmable logic device (PLD), a discrete gate or transistor logic, a discrete hardware component, or any combination thereof that is designed to perform the functions described herein may be utilized to implement or perform the respective logic blocks, modules, and circuits illustrated. The general-purpose processor may be a microprocessor, but as an alternative, the processor may be any commercially available processor, controller, microcontroller, or state machine. The processor may also be implemented as a combination of computing devices, for example, a combination of a DSP and a microprocessor, a plurality of microprocessors, a microprocessor that collaborates with DSP cores, or any other such configurations.

The steps in conjunction with the methods or algorithms described in the present disclosure may be directly embedded in hardware, software modules executed by the processor, or a combination of these two. Software modules may exist in any form of tangible storage medium. Some examples of the storage medium that may be used include a random access memory (RAM), a read-only memory (ROM), a flash memory, an EPROM memory, an EEPROM memory, a register, a hard drive, a removable disk, a CD-ROM, etc. The storage medium may be coupled to the processor so that the processor may read information from the storage medium and write information to the storage medium. In an alternative mode, the storage medium may be integrated with the processor as a whole. The software module may be a single instruction or a plurality of instructions, and may be distributed across several different code segments, across different programs, and across a plurality of storage media.

The methods disclosed herein include actions for implementing the described methods. Methods and/or actions may be interchangeable with each other without departing from the scope of the claims. In other words, unless a specific order of actions is specified, the order and/or use of specific actions may be modified without departing from the scope of the claims.

The above-described functions may be implemented by hardware, software, firmware, or any combination thereof. If implemented by software, functions may be stored as instructions on a tangible computer readable medium. The storage medium may be any available tangible medium that may be accessed by a computer. By example rather than limitation, such computer readable medium may include a RAM, a ROM, an EEPROM, a CD-ROM or other optical storage, magnetic storage or other magnetic storage device, or any other tangible medium that may be used for carrying or storing desired program code in a form of instruction or data structure and may be accessed by a computer. As used here, a disk and a disc include a compact disc (CD), a laser disc, an optical disc, a digital versatile disc (DVD), a floppy disc, and a blue disc, where the disk usually magnetically reproduces data, while the disc optically reproduces data with laser.

Therefore, a computer program product may perform the operations given here. For example, such a computer program product may be a computer readable tangible medium having instructions tangibly stored (and/or encoded) thereon, and the instructions may be executed by a processor to perform the operations described herein. The computer program product may include a packaging material.

Software or instructions may also be transmitted through a transmission medium. For example, software may be transmitted from websites, servers, or other remote sources by using a transmission medium such as a coaxial cable, a fiber optic cable, a twisted pair cable, a digital subscriber line (DSL), or wireless technologies such as infrared, radio, or microwave.

In addition, modules and/or other appropriate means for carrying out the methods and techniques described herein may be downloaded and/or otherwise obtained by user terminals and/or base stations as appropriate. For example, such a device may be coupled to a server to facilitate the transmission of the means for performing the methods described herein. Or, the respective methods described here may be supplied by a storage component (e.g., a RAM, a ROM, a physical storage medium such as a CD or a floppy disk, etc.), so that the user terminal and/or the base station may obtain various methods when being coupled to the device or providing the storage component to the device. In addition, any other appropriate techniques for providing the methods and techniques described herein to the device may be utilized.

Other examples and implementation modes are within the scope and spirit of the present disclosure and the appended claims. For example, due to the nature of software, the functions described above may be implemented by using software executed by a processor, hardware, firmware, hard wiring, or any combination of the above. The features that implement functionality may also be physically located in respective locations, including being distributed so that the parts of the functionality may be implemented in different physical locations. Moreover, as used herein, also as used in the claims, the wording "or" used in enumeration of items starting with "at least one", indicates separate enumeration, so that enumeration, for example, "at least one of A, B or C" means A or B or C, or AB or AC or BC or ABC (i.e., A and B and C). Furthermore, the wording "exemplary" does not imply that the described example is preferred or better than other examples.

Various changes, substitutions, and modifications to the technology described herein may be made without departing from the taught technology defined by the appended claims. In addition, the scope of the claims of the present disclosure is not limited to specific aspects of processing, machinery, fabrication, composition of events, means, methods, and actions described above. The processing, machinery, fabrication, composition of events, means, methods, and actions that currently exist or will be developed later may be utilized to perform substantially the same functions or implement substantially the same results as described herein. Therefore, the appended claims include such processing, machinery, fabrication, composition of events, means, methods, and actions within the scope thereof.

The above description of the disclosed aspects is provided so that any skilled in the art may implement or use the present disclosure. Various modifications to these aspects are very obvious to those skilled in the art, and the general principles defined here may be applied to other aspects without departing from the scope of the present disclosure. Therefore, the present disclosure is not intended to be limited to the aspects shown here, but rather to the widest range consistent with the principles and novel features disclosed herein.

For the purpose of illustration and description, the above description has been provided. Furthermore, such description is not intended to limit the embodiments of the present disclosure to the form disclosed herein. Although a plurality of exemplary aspects and embodiments have been discussed above, those skilled in the art will recognize certain variations, modifications, alterations, additions, and sub-combinations thereof.

The invention claimed is:

1. A processor chip for flexibly accessing data, comprising:
 a memory, configured to store read-in tensor data from outside the processor chip, the read-in tensor data comprising a plurality of elements for performing a tensor operation of an operator;
 a storage controller, configured to compute addresses in the memory, control reading the plurality of elements from the memory according to the tensor operation of the operator, and send the plurality of elements for performing the tensor operation of the operator based on the plurality of elements,
 wherein the storage controller has an interface for receiving a parameter that is configured by software, the storage controller computes the addresses in the memory in one-layer read loop or multi-layer read loop nest according to the parameter that is received by the interface, and the storage controller reads the plurality of elements from the addresses, and
 wherein the parameter that is configured by the software indicates that the tensor operation of the operator is replaced by a mode of reading the plurality of elements from the addresses in the memory.

2. The processor chip according to claim 1,
 wherein the parameter that is configured by the software comprises: a value representing a number of the plurality of elements to be read from the read-in tensor data in the one-layer read loop, and a value representing a stride between respective steps in the one-layer read loop; or
 the parameter that is configured by the software comprises: a value representing a number of steps of reading in respective layers of read loops, and a value representing a stride between respective steps in respective layers of the read loops, wherein the respective layers of the read loops are performed from an outer layer to an inner layer in a nested manner.

3. The processor chip according to claim 1, wherein the parameter that is configured by the software comprises: a value representing a number of addresses spaced between an address of a first element read in the one-layer read loop and an initial address of an input tensor in the memory.

4. The processor chip according to claim 1, wherein the parameter that is configured by the software comprises a condition specific to the parameter, and the parameter has different values when the condition is met and when the condition is not met.

5. The processor chip according to claim 4, wherein the parameter is a value representing a number of steps of reading in a specific layer of read loops, and the condition is which step of reading proceeds to in another layer of read loops outer than the specific layer.

6. The processor chip according to claim 2, wherein the storage controller computes an address to be read currently according to a currently proceeded step in the one-layer read loop or the respective layers of the read loops as well as respective strides of the one-layer read loop or the respective layers of the read loops.

7. The processor chip according to claim 1, wherein the tensor operation is tensor manipulation without changing numerical values in an input tensor, and the storage controller computes an address in the memory to be read each time in the one-layer read loop or the multi-layer read loop nest according to the parameter configured that is received through the interface, so that the tensor manipulation is replaced by reading.

8. The processor chip according to claim 7, wherein the tensor operation comprises at least one from a group consisting of: operation of transpose operator, operation of reshape operator, operation of broadcast operator, operation of gatherer operator, operation of reverse operator, operation of concat operator, and operation of cast operator, wherein the memory is divided into a plurality of banks for respectively storing data that is capable of being accessed in parallel, and the storage controller comprises a crossbar having a read function and a write function that are separated, so as to access the data stored in the plurality of banks of the memory in parallel.

9. A method for flexibly accessing data in a processor chip, comprising:
storing, by a memory in the processor chip, read-in tensor data from outside the processor chip, the read-in tensor data comprising a plurality of elements for performing a tensor operation of an operator;
controlling reading the plurality of elements from the memory according to the tensor operation of the operator to send the plurality of elements for performing the tensor operation of the operator based on the plurality of elements;
computing addresses in the memory in one-layer read loop or multi-layer read loop nest according to a parameter that is configured by software and is received, so as to read the plurality of elements from the addresses,
wherein the parameter that is configured by the software indicates that the tensor operation of the operator is replaced by a mode of reading the plurality of elements from the addresses in the memory.

10. The method according to claim 9,
wherein the parameter that is configured by the software comprises: a value representing a number of the plurality of elements to be read from the read-in tensor data in the one-layer read loop, and a value representing a stride between respective steps in the one-layer read loop; or
the parameter that is configured by the software comprises: a value representing a number of steps of reading in respective layers of read loops, and a value representing a stride between respective steps in respective layers of the read loops, wherein the respective layers of the read loops are performed from an outer layer to an inner layer in a nested manner.

11. The method according to claim 9, wherein the parameter that is configured by the software comprises: a value representing a number of addresses spaced between an address of a first element read in the one-layer read loop and an initial address of an input tensor in the memory.

12. The method according to claim 9, wherein the parameter that is configured by the software comprises a condition specific to the parameter, and the parameter has different values when the condition is met and when the condition is not met.

13. The method according to claim 12, wherein the parameter is a value representing a number of steps of reading in a specific layer of read loops, and the condition is which step of reading proceeds to in another layer of read loops outer than the specific layer.

14. The method according to claim 10, further comprising:
computing an address to be read currently according to a currently proceeded step in the one-layer read loop or the respective layers of the read loops as well as respective strides of the one-layer read loop or the respective layers of the read loops.

15. The method according to claim 9, wherein the tensor operation is tensor manipulation without changing numerical values in an input tensor, and an address in the memory to be read each time is computed in the one-layer read loop or the multi-layer read loop nest according to the parameter configured that is received through the interface, so that the tensor manipulation is replaced by reading.

16. The method according to claim 15, wherein the tensor operation comprises at least one from a group consisting of: operation of transpose operator, operation of reshape operator, operation of broadcast operator, operation of gatherer operator, operation of reverse operator, operation of concat operator, and operation of cast operator, wherein the memory is divided into a plurality of banks for respectively storing data that is capable of being accessed in parallel, and the method further comprises accessing the data stored in the plurality of banks of the memory in parallel through a crossbar having a read function and a write function that are separated.

17. An electronic device, comprising:
a memory, configured to store instructions; and
a processor, configured to read the instructions from the memory and execute the method according to claim 9.

18. A non-transitory storage medium, wherein instructions are stored on the non-transitory storage medium, and the instructions, when read by a processor, cause the processor to execute the method according to claim 9.

* * * * *